(12) United States Patent
Hayasaki

(10) Patent No.: US 7,152,940 B2
(45) Date of Patent: Dec. 26, 2006

(54) PRINTING APPARATUS, CONTROL METHOD THEREFOR, PRINTHEAD, PRINTHEAD ELEMENT BASE, LIQUID DISCHARGE APPARATUS, LIQUID DISCHARGE HEAD, AND LIQUID DISCHARGE HEAD ELEMENT BASE

(75) Inventor: Kimiyuki Hayasaki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 172 days.

(21) Appl. No.: 10/629,626

(22) Filed: Jul. 30, 2003

(65) Prior Publication Data

US 2004/0021709 A1  Feb. 5, 2004

(30) Foreign Application Priority Data

Aug. 1, 2002  (JP) .............................. 2002-224878

(51) Int. Cl.
  B41J 29/393  (2006.01)
  B41J 2/175  (2006.01)
(52) U.S. Cl. ....................................................... 347/19
(58) Field of Classification Search ................... 347/5, 347/9, 10, 11, 14, 37, 49, 57, 58, 19
See application file for complete search history.

(56) References Cited

U.S. PATENT DOCUMENTS

| | | | |
|---|---|---|---|
| 4,313,124 A | 1/1982 | Hara | |
| 4,345,262 A | 8/1982 | Shirato et al. | |
| 4,463,359 A | 7/1984 | Ayata et al. | |
| 4,723,129 A | 2/1988 | Endo et al. | |
| 4,740,796 A | 4/1988 | Endo et al. | |
| 5,138,344 A | 8/1992 | Ujita | |
| 5,431,502 A | 7/1995 | Orii et al. | |
| 5,485,178 A | 1/1996 | Tateyama et al. | |
| 5,610,635 A | 3/1997 | Murray et al. | |
| 5,788,388 A | 8/1998 | Cowger et al. | |
| 5,812,156 A | 9/1998 | Bullock et al. | |
| 5,894,315 A | 4/1999 | Yamane | |
| 5,969,730 A | 10/1999 | Inose et al. | |
| 6,036,297 A | 3/2000 | Hayasaki | |
| 6,042,213 A | 3/2000 | Hayasaki | |
| 6,116,714 A | 9/2000 | Imanaka et al. | |
| 6,116,717 A | 9/2000 | Anderson et al. | |
| 6,196,670 B1* | 3/2001 | Saruta | 347/86 |
| 6,318,828 B1* | 11/2001 | Barbour et al. | 347/9 |
| 6,325,482 B1 | 12/2001 | Hayasaki et al. | |
| 6,409,300 B1 | 6/2002 | Imanaka et al. | |
| 6,476,928 B1 | 11/2002 | Barbour et al. | |
| 6,494,559 B1* | 12/2002 | Tsuji | 347/19 |
| 6,522,416 B1 | 2/2003 | Matsumoto et al. | |
| 6,533,383 B1 | 3/2003 | Saruta et al. | |
| 6,631,967 B1* | 10/2003 | Saruta | 347/19 |
| 6,862,652 B1 | 3/2005 | Tsuji | |
| 6,863,377 B1 | 3/2005 | Walker et al. | |
| 2001/0045967 A1 | 11/2001 | Hayasaki | |
| 2002/0196302 A1* | 12/2002 | Saruta | 347/19 |

FOREIGN PATENT DOCUMENTS

| | | |
|---|---|---|
| EP | 0 710 562 A1 | 5/1996 |
| EP | 1 070 598 A1 | 1/2001 |

(Continued)

*Primary Examiner*—Anh T. N. Vo
(74) *Attorney, Agent, or Firm*—Fitzpatrick, Cella, Harper & Scinto

(57) ABSTRACT

A printing apparatus has a command control unit in a carriage or a printhead. The control unit receives a command for causing the printhead to perform predetermined control, and controls the printhead in accordance with the received command.

9 Claims, 17 Drawing Sheets

FOREIGN PATENT DOCUMENTS

| | | |
|---|---|---|
| EP | 1 079 326 A2 | 2/2001 |
| JP | 5-193127 | 8/1993 |
| JP | 7-241992 | 9/1995 |
| JP | 8-132645 | 5/1996 |
| KR | 2000-35729 | 6/2000 |

* cited by examiner

FIG. 6

| INFORMATION IDENTIFICATION NAME | STORAGE ADDRESS |
|---|---|
| HEAD TYPE INFORMATION | 0xXXXX ~ 0xYYYY |
| RANK INFORMATION | 0xPPPPP ~ 0xQQQQ |
| DRIVING CONTROL INFORMATION | 0xSSSS ~ 0xTTTT |
| HEAD CORRECTION INFORMATION | 0xUUUU ~ 0xVVVV |
| INK TYPE INFORMATION | 0xRRRR ~ 0xMMMM |
| MANUFACTURING TIME INFORMATION | 0xNNNN ~ 0xLLLL |
| USE STATUS INFORMATION | 0xJJJJ ~ 0xKKKK |
| ⋮ | ⋮ |

PRINTING APPARATUS, CONTROL METHOD THEREFOR, PRINTHEAD, PRINTHEAD ELEMENT BASE, LIQUID DISCHARGE APPARATUS, LIQUID DISCHARGE HEAD, AND LIQUID DISCHARGE HEAD ELEMENT BASE

FIELD OF THE INVENTION

The present invention relates to a printing apparatus, printhead, and printhead element base and, more particularly, to a printing apparatus which performs control using a command for causing a printhead to execute predetermined processing, a printhead, a printhead element base, and a liquid discharge head and apparatus for discharging various liquids.

BACKGROUND OF THE INVENTION

Printing apparatuses which print information such as a desired character or image on a sheet-like printing medium such as a paper sheet or film are widely used as an information output apparatus in a word processor, personal computer, facsimile apparatus, and the like. These printing apparatuses are used as printers in current business offices, in other business affairs departments, and for personal use. The printing apparatuses have been developed and improved for achieving further cost reduction, higher resolution, and the like while strongly requiring high density and high-speed printing.

Of these printing apparatuses, an ink-jet printing apparatus which discharges ink from the orifices of printing elements to perform printing as quiet nonimpact printing can realize high density and high-speed printing because of its structural feature, and is widely spread as a low-cost color printer or the like. The ink-jet printing apparatus performs printing by discharging ink in accordance with desired printing information by using a printhead having a printing element (nozzle) with an orifice and an electrothermal transducer which generates discharge energy for discharging ink from the orifice.

As the printhead structure, various printheads in which a plurality of printing elements are aligned in one or a plurality of lines have conventionally been known. In a printhead of this type, N printing elements are designed as one block, and several or several dozen driving integrated circuits which can be simultaneously driven are mounted on a single board. Image data are aligned in correspondence with printing elements, and arbitrary printing is done on a target printing member (printing medium) such as a paper sheet.

With recent increases in resolution and image quality, the printhead performance has greatly been improved. The number of printing elements to be simultaneously driven increases because the number of printing elements has been increased or in order to increase the printing speed.

As the number of printing elements to be simultaneously driven becomes larger, energy necessary for driving also becomes larger. A printing element driving method corresponding to the capacitance of a power supply circuit is required. For a printing element which performs printing by using heat, continuous driving of one printing element accumulates heat, changing the printing concentration or destructing the printing element itself. In the presence of a factor such as manufacturing variations, proper printing element energy cannot be obtained for application energy, which degrades the printhead durability or the like.

A printing element is also influenced by an adjacent printing element. For example, in an ink-jet printing apparatus, when adjacent printing elements are simultaneously driven, nozzles receive pressure interference owing to a pressure generated in ink discharge. The pressure interference (crosstalk) may change the printing concentration. It is, therefore, desirable to set an idle time for dissipating heat or avoiding crosstalk.

To cope with these problems and demands, there is proposed an arrangement in which the printhead incorporates, e.g., a means for detecting a printhead temperature, a means capable of arbitrarily changing a driving method by an external input signal, and a means for detecting the difference between printheads due to manufacturing variations, and if necessary, pieces of information are extracted and controlled.

Various types of printheads are proposed in accordance with the performance of the printer main body, and a printhead having information for identifying the type of printhead is also available. In particular, an ink-jet printhead has various pieces of printhead information necessary for the printer main body, such as the ink use amount of an expendable ink cartridge.

A circuit arrangement in which printing elements are grouped into a plurality of blocks every predetermined number of printing elements and the blocks are driven in time division is put into practical use.

In a printing apparatus using such printhead, the number of printing elements in the printhead increases, and the density also tends to increase for the purpose of high printing speed and high printing density. Accordingly, the number of blocks in the above-mentioned time division driving increases, and the number of control signal lines also increases even in the use of a decoder circuit or the like. As the image quality and function are improved, the printhead structure becomes complicated, and its control becomes cumbersome, overloading the control unit of the main body apparatus. For example, the control unit must manage/execute a control sequence of, e.g., changing a driving pattern in accordance with the printing mode such as high-image-quality printing or high-speed printing, manage and calibrate the influence of the difference in printing state on an image owing to printhead manufacturing variations or the difference between lots, determine the type of head, or sequentially monitor the driving status.

As for collecting information for determination of the type of head or the like, a recent printhead has a data holding function such as a nonvolatile memory (to be simply referred to as a memory hereinafter). The memory stores, as printhead feature information, data such as manufacturing variation information of a printing element or temperature sensor, manufacturing time information containing a printhead manufacturing date, printhead structure information, and a printhead printing dot count value. The printhead memory holds data such as the feature information in a non-rewritable or rewritable state. When, for example, the printhead is mounted on the main body apparatus, all stored data are read out. Necessary information is reflected in the internal register of the main body apparatus or the like, realizing control corresponding to each printhead. The main body apparatus refers to mapping information which makes the type of information and a storage position correspond to each other, extracts information necessary for control from all data read out from the printhead memory, and utilizes the information for various control operations.

In real-time driving control of performing driving coping with, e.g., temperature detection during printing, processing in correspondence with mapping during read of data (feature information or the like) from the memory decreases the throughput, failing to achieve high-speed, high-image-quality printing. Especially for a thermal head and thermal ink-jet head, the printing temperature greatly influences a printed image. Hence, driving energy control corresponding to the printhead temperature is important, and is an indispensable function for a high-image-quality printing apparatus. The main body apparatus must send a large amount of printing data to the printhead at a high speed, and it is difficult to execute control during detection of head information in terms of the processing time.

The control load on the apparatus main body is heavy in a conventional arrangement in which the apparatus main body performs fine driving control not only for read of head information but also for, e.g., adjustment of a driving signal for driving the printing element of the printhead.

One problem of the prior art is that fine control processing for performing predetermined head processing is executed by the control circuit of the apparatus main body.

Further, read of data from the printhead takes a long time because all data in the head are conventionally read out to the apparatus and necessary data are selected and used in the main body apparatus in acquiring head information. This can be ignored when data is read out from the printhead at a timing when a sufficient time can be used for read (e.g., a timing when the apparatus is powered on). However, when data must be extracted from the printhead within a short time for real-time driving control such as the above-mentioned temperature detection and driving signal control, no time can be ensured for information acquisition and control processing.

Every time the number of types of printheads increases, mapping information of the memory for each printhead must also be set, and read processing in the main body apparatus must be changed for each type of printhead. To allow the main body apparatus to extract common specific information from various types of printheads by the same read processing, the memory storage method and storage address must be common between different types of printheads. In this case, the degree of freedom of using a memory for each head is greatly limited.

The above-described technical background requires a printhead to perform predetermined processing by a simple control instruction to a carriage or head without outputting a fine control signal from the control circuit of the apparatus main body (circuit board of the apparatus main body) to the head when the printhead performs predetermined processing.

It is also required to efficiently extract information held by the printhead.

It is further required to acquire necessary information from the printhead at a high speed.

It is still further required to increase the degree of freedom of using a memory mounted in the printhead.

SUMMARY OF THE INVENTION

According-to one aspect of the invention, there is provided a printing apparatus which performs printing by using a printhead having a printing element for performing printing on a target printing medium. The printing apparatus comprises: command generation means for outputting a command for causing the printhead to perform predetermined processing; a carriage which supports the printhead and scans the printhead on the target printing medium; and control means, arranged on the the carriage, for receiving the command generated by the command generation means and outputting a control signal corresponding to the command to the printhead, thereby controlling the printhead.

According to another aspect of the invention, there is provided a method of controlling a printing apparatus including a printhead having a printing element for performing printing and storage means for storing feature information, a first control unit which controls the printing apparatus, and a second control unit which is mounted on a cartridge for carrying the printhead or arranged in the printhead, and can operate independently of the first control unit. The method comprises: a command generation step of causing the first control unit to generate a command for acquiring specific information from information held by the printhead; and a control step of causing the second control unit to receive the command generated in the command generation step, access the storage means of the printhead, and acquire the specific information corresponding to the command from the storage means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6 is a table showing a data structure example of a table which makes the address and information identification name of information stored in a memory block correspond to each other;

DETAILED DESCRIPTION OF THE PREFERRED EMBODIMENTS

Preferred embodiments of the present invention will now be described in detail in accordance with the accompanying drawings.

"Printing" in the present invention means not only formation of a significant image such as a character or figure on a target printing medium, but also formation of an insignificant image such as a pattern.

An "element base" (to be described later) represents not a mere base formed from silicon semiconductor, but a base having an element, line, and the like.

"On the element base" means not only "on the element base", but also "the surface of the element base" and "in the element base near the surface". "Integration" in the present invention does not mean that separate elements are simply arranged on a base, but means that elements are integrally formed and manufactured on an element base by a semiconductor circuit manufacturing process or the like.

[First Embodiment]

Figure 1:
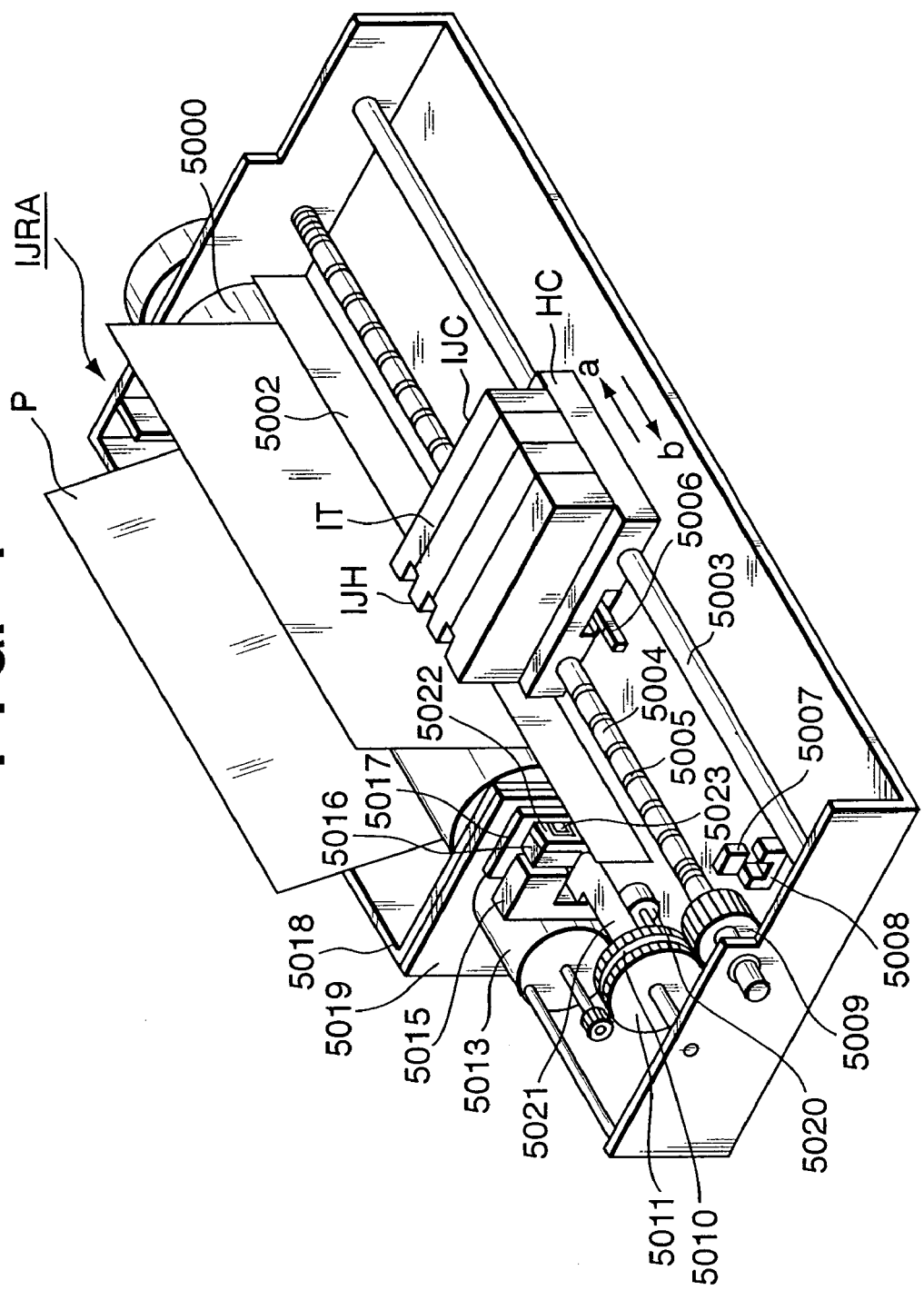
FIG. 1 is a schematic view showing an ink-jet printing apparatus to which the present invention can be applied.

FIG. 1 is a schematic view showing an ink-jet printing apparatus to which the present invention can be applied. In FIG. 1, a lead screw 5004 rotates via driving force transfer gears 5011 and 5009 while interlocking with forward/reverse rotation of a carriage motor 5013. A carriage HC has a pin (not shown) which engages with a helical groove 5005 of the lead screw 5004, and reciprocates in directions indicated by arrows a and b along with rotation of the lead screw 5004. The carriage HC supports an ink-jet cartridge IJC. The ink-jet cartridge IJC comprises an ink-jet head IJH (to be referred to as a head unit hereinafter) and an ink tank IT which stores printing ink.

Reference numeral 5002 denotes a sheet press plate which presses a paper sheet against a platen 5000 in the carriage moving direction. The platen 5000 is rotated by a convey motor (not shown), and conveys a printing sheet P. Reference numerals 5007 and 5008 denote photosensors serving as home position detection means for detecting the presence of a carriage lever 5006 in a corresponding region and switching the rotational direction of the motor 5013; 5016, a member which supports a cap member 5022 that caps the front surface of the printhead; 5015, a suction means which sucks the interior of the cap and performs suction recovery of the printhead via an intra-cap opening 5023; 5017, a cleaning blade; and 5019, a member capable of moving the blade back and forth. These members are supported by a main body support plate 5018. The blade is not limited to this form, and this embodiment can employ a known cleaning blade. Reference numeral 5021 denotes a lever which starts suction for suction recovery, and moves along with movement of a cam 5020 engaged with the carriage. A driving force from the driving motor is controlled by a known transfer mechanism such as a clutch switch.

Capping, cleaning, and suction recovery are executed by desired processes at corresponding positions by the operation of the lead screw 5004 when the carriage comes to the home-position region. This embodiment can adopt any arrangement as long as desired operations are done at known timings.

Figure 2:
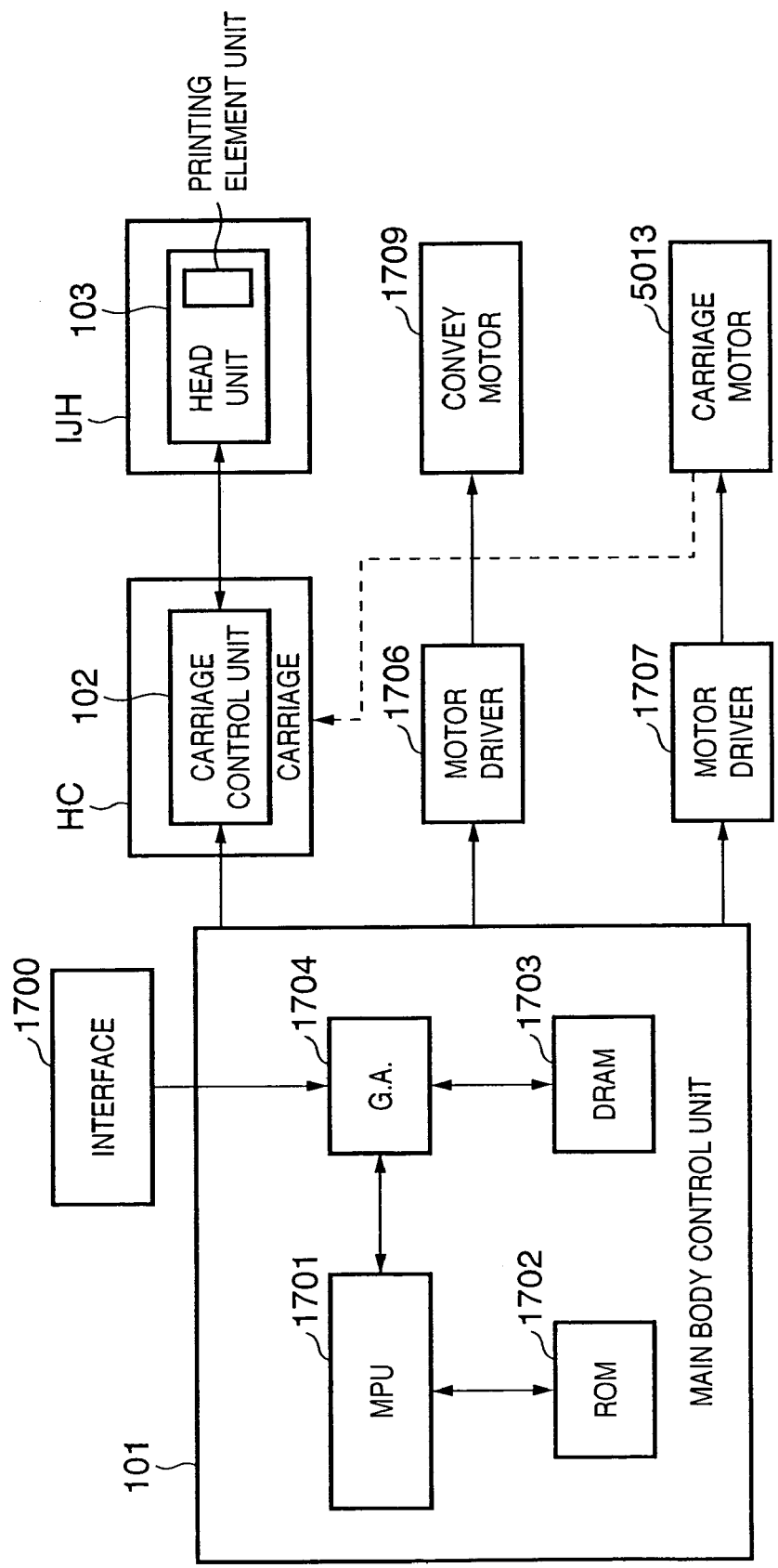
FIG. 2 is a block diagram showing the outline of the control arrangement of the ink-jet printing apparatus shown in FIG. 1.

A control arrangement for executing printing control of the above-described apparatus will be described with reference to the block diagram shown in FIG. 2. In FIG. 2 showing the control circuit, reference numeral 1700 denotes an interface which inputs a printing signal; 1701, an MPU; 1702, a program ROM which stores a control program executed by the MPU 1701; 1703, a dynamic RAM (to be referred to as a DRAM hereinafter) which stores various data (printing signal, printing data supplied to the head, and the like); and 1704, a gate array which controls supply of printing data to a printhead IJH, and also controls data transfer between the interface 1700, the MPU 1701, and the RAM 1703. A main body control unit 101 has this arrangement.

Reference numeral 1709 denotes a convey motor (not shown in FIG. 1) for conveying a printing sheet P; 1706, a motor driver for driving the convey motor 1709; and 1707, a motor driver for driving the carrier motor 5013.

The operation of the control arrangement will be explained. When a printing signal is input to the interface 1700, the printing signal is converted into printing data between the gate array 1704 and the MPU 1701. The motor drivers 1706 and 1707 are driven, and the ink-jet head is driven in accordance with the printing data sent to the carriage HC to print an image on the printing sheet P.

For optimal driving in driving the printing element unit of the ink-jet head IJH, the driving form of each printing element is determined by referring to feature information held in the memory of a head unit 103. In the following description, the ink-jet head IJH will be referred to as a printhead.

The first embodiment will describe an example in which a command output from a main body control unit such as the control board of the apparatus main body is processed in the carriage to control driving of the head.

In the following description, commands are a command for acquiring feature information stored in the memory of the printhead, and a command for performing driving control of the printing element.

Figure 3:
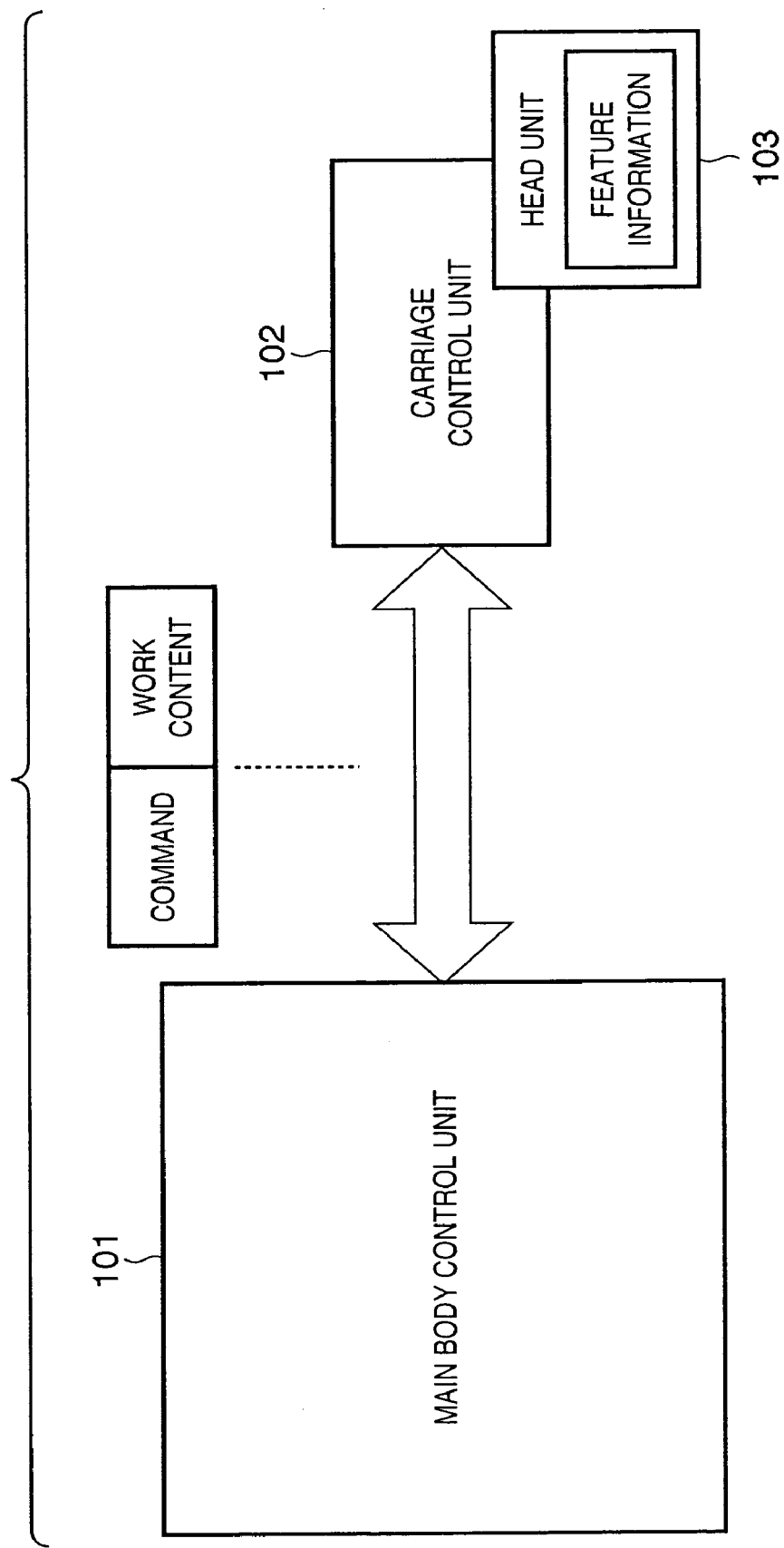
FIG. 3 is a block diagram showing a basic arrangement for acquiring feature information stored in the memory of a printhead according to the first embodiment.

FIG. 3 is a block diagram showing a basic arrangement for acquiring feature information stored in the memory of the printhead according to the first embodiment. The printhead comprises the head unit 103 including a printing element which performs printing in accordance with a received command and an arrangement which outputs various pieces of feature information on printing. Similar to the prior art, the head unit 103 is mounted on the carriage HC and electrically connected to it. The printhead and carriage HC can be electrically connected by various methods such as a contact pad having a gold-plated terminal. A carriage control unit 102 in the carriage HC can selectively read out printhead feature information from the head unit 103 in accordance with a command sent from the main body control unit. This function of the carriage control unit 102 allows even a conventional printhead to acquire printhead feature information in accordance with a command from the main body control unit 101.

Figure 4:
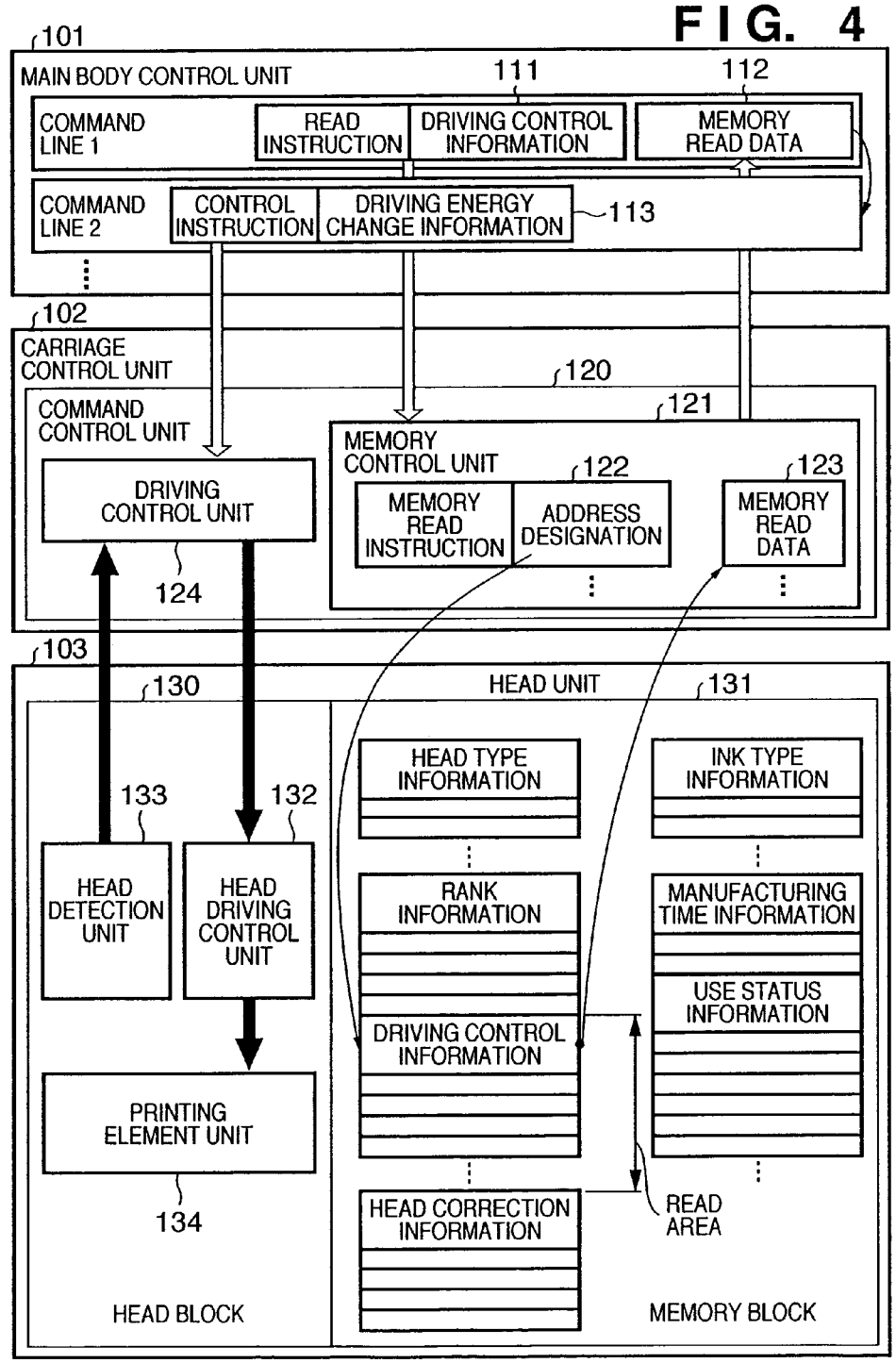
FIG. 4 is a schematic block diagram showing a command communication system according to the first embodiment.

FIG. 4 is a schematic block diagram showing a command communication system according to the first embodiment.

Outline arrows represent command line transmission, and black arrows represent general signal exchange. The first embodiment assumes, e.g., a sequence of acquiring printhead manufacturing variation information from the printhead (command line 1), and correcting printing energy on the basis of the information (command line 2). Note that manufacturing variation information is stored as driving control information in a predetermined area of a memory block in the head unit 103.

Figure 5:
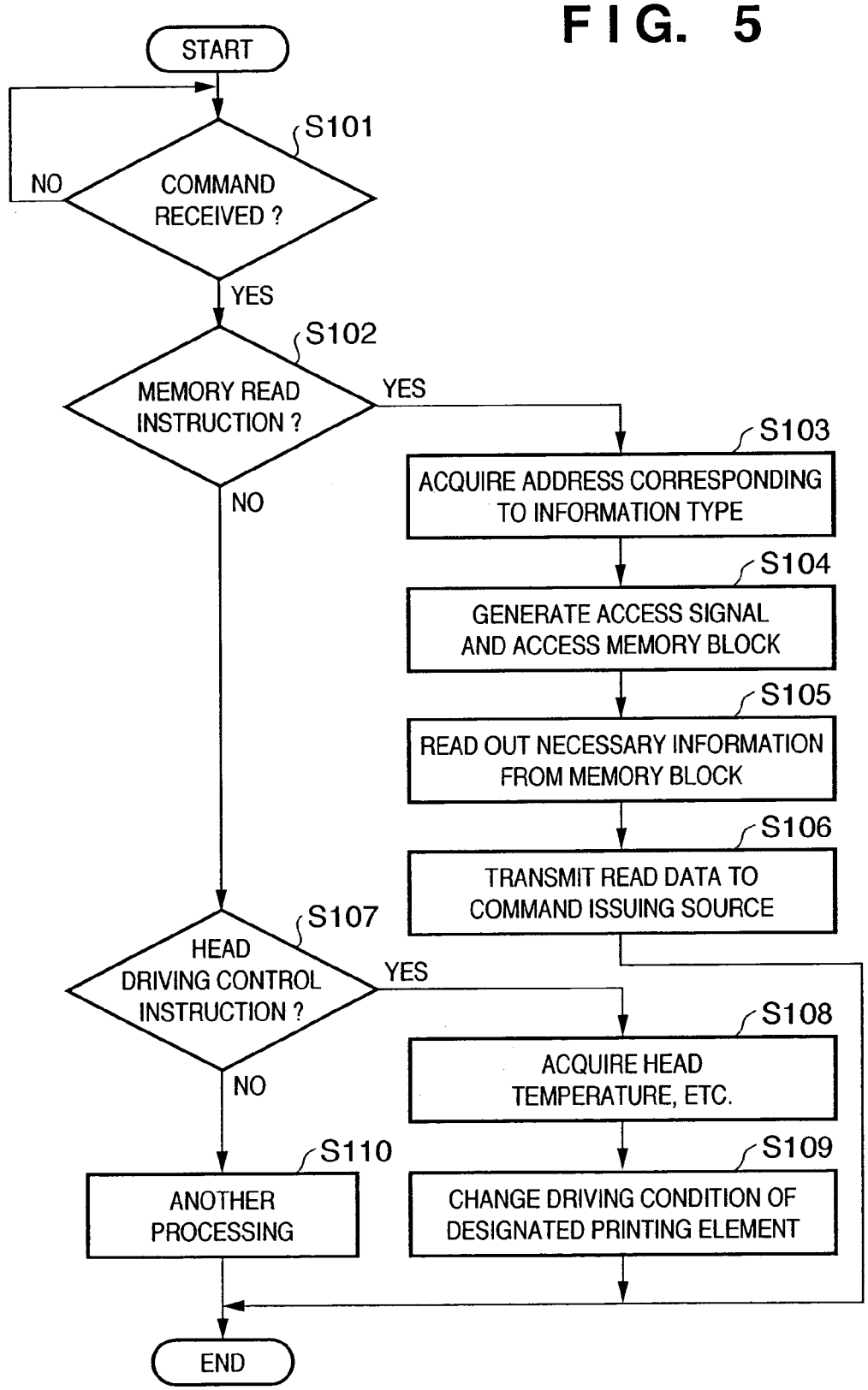
FIG. 5 is a flow chart for explaining the operation of a command control unit.

If command line 1 is executed in the main body control unit 101, the main body control unit 101 generates a command 111 for "reading outs "driving control information" of the printhead, and sends the command 111 to the carriage. In the carriage control unit 102, the command 111 is received by a memory control unit 121 which constitutes a command control unit 120 in the carriage. The memory control unit 121 reads out and acquires necessary information from a memory block 131 of the head unit 103 in accordance with the received command. FIG. 5 is a flow chart for explaining the operation of the command control unit 120. The operation of the command control unit 120 which has received the command 111 will be explained with reference to the flow chart.

The command control unit 120 waits for transmission of a command (step S101), and if it receives a command, determines the type of command (steps S102 and S107). The command 111 in this example is a memory read instruction for reading out driving control information, and the processing advances from step S102 to step S103 (the command is transferred to the memory control unit 121 in FIG. 4). Processes in steps S103 to S106 are executed by the memory control unit 121. In step S103, an address at which information designated by the command is stored is acquired among addresses in the nonvolatile memory (memory block 131) of the head unit 103. In this example, an address at which driving control information is stored is acquired. In step S104, the command control unit 120 generates an access signal (memory read instruction+address) 122 to the memory block 131 so as to read information from the address.

Information representing the correspondence between information and its storage address in the memory block 131 is held as a table as shown in FIG. 6 by the memory control unit 121. An address corresponding to information (information identification name) designated by the command 111 is obtained by looking up the table, and a proper access signal 122 is generated as a control signal. In this example, read of driving control information is designated, and an access signal is so generated as to read information stored at addresses 0xSSSS to 0xTTTT. Driving control information is read out from the memory block 131.

In order to cope with a plurality of types of printheads, a table as shown in FIG. 6 is prepared for each printhead, and an access signal is generated by looking up a table corresponding to a currently mounted printhead. A plurality of types of tables are stored in the memory of the memory control unit 121 in advance, and a table to be looked up is selected and used from head type information of the mounted printhead. In this case, the storage address of the head type information in the memory block 131 must be common between all types of printheads. Alternatively, a table as shown in FIG. 6 may be stored at a predetermined address in the memory block of the printhead, and read out and held by the command control unit 120 upon mounting the printhead (or powering on the apparatus).

In this way, the memory control unit 121 generates an access signal by using the address acquired in step S103, and accesses the memory block 131 in accordance with the access signal 122 (step S104). The memory block 131 in the head unit 103 is accessed and outputs driving control information by arbitrary address designation. The memory control unit 121 reads out the information (driving control information) designated by the command 111, and acquires the information as memory read data 123 (step S105). The acquired memory read data 123 is sent as the execution result (memory read data 112) of command line 1 to the main body control unit 101 which has issued the command 111 (step S106).

In the above example, the carriage control unit 102 sends back the read printhead driving control information to the main body control unit 101. The carriage control unit 102 may execute feedback control of directly controlling the head on the basis of the acquired information. When the control system must control driving in real time, control is completed by only the carriage control unit 102, thereby quickly controlling the printhead. This example will be described in the second embodiment.

As will be described in the third embodiment, a sequence control unit and the command control unit 120 may be arranged in the carriage.

At the end of command line 1 by the main body control unit 101, command line 2 is executed in accordance with the sequence. In command line 2, "driving energy change information" is transferred as a "control instruction". More specifically, driving energy change information is generated on the basis of the memory read data 112 (driving control information) acquired by command line 1. A command 113 of changing driving control of the printing element is generated in accordance with the driving energy change information.

If the command control unit 120 of the carriage control unit 102 receives the command 113, the processing advances from step S107 to step 5108. Steps S108 and S109 are executed by a driving control unit 124. The driving control unit 124 sets the driving energy change information of the command 113 in each register, changes energy (e.g., pulse width or application voltage) of a driving signal for driving each printing element, and transmits the instruction to a head driving control unit 132. Optimal driving of each printing element in a printing element unit 134 can therefore be achieved.

In this case, control of changing the pulse width or voltage is done. If another command for adjusting the driving timing of the printing element is received, corresponding processing is executed (step S110). A description of individual processing will be omitted.

A plurality of command lines are prepared in accordance with printhead functions; only a necessary function can be controlled at an arbitrary timing. By supplying a minimum command, the carriage control unit can arbitrate commands and feedback-control the printhead function. Even during printing, driving is completely controlled in the carriage by the internal register of the carriage, and the main body control unit can concentrate on image data transfer.

Figure 7:
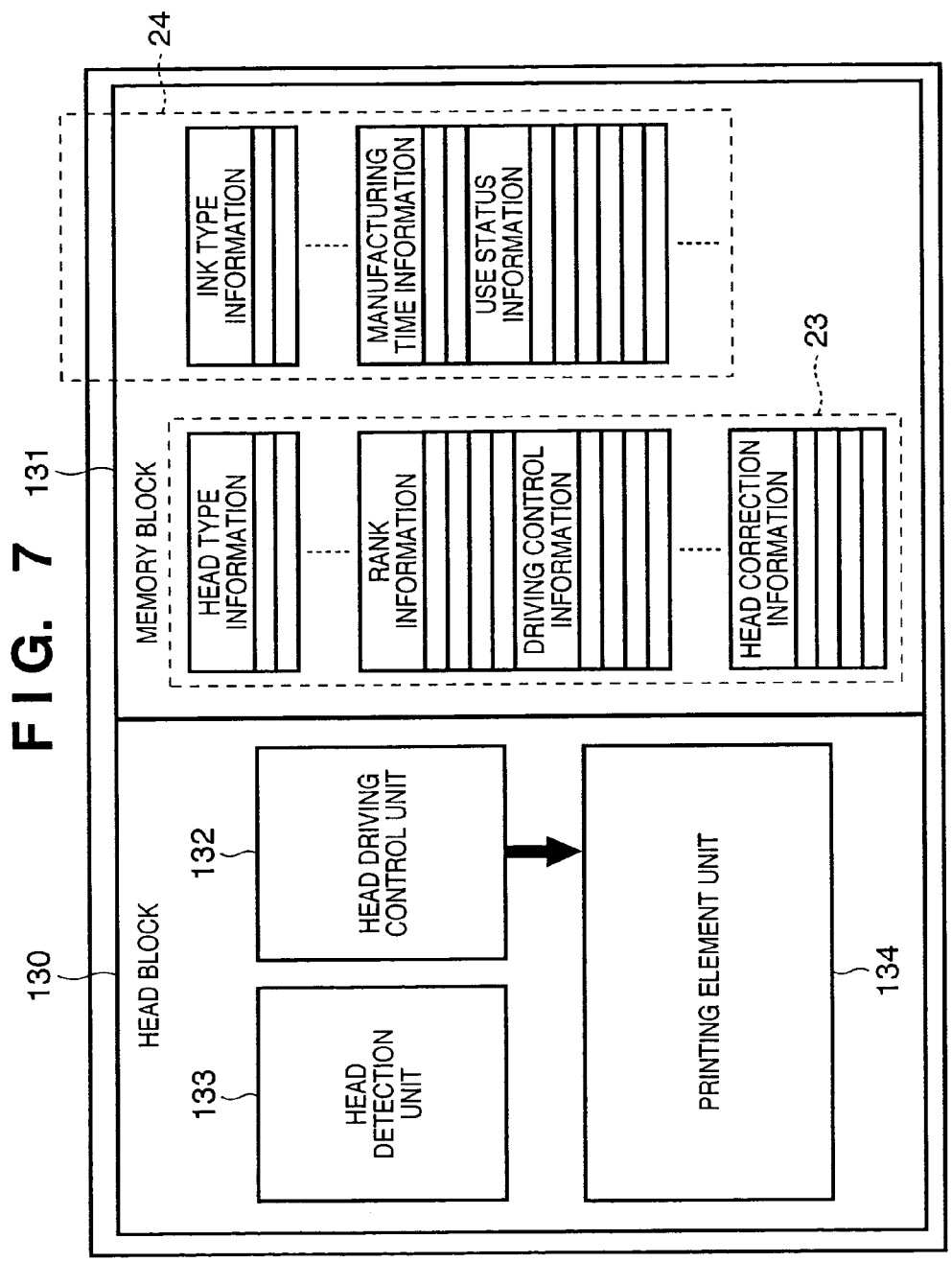
FIG. 7 is a block diagram for explaining the arrangement of a printhead (head unit) applicable to the first embodiment.

FIG. 7 is a block diagram for explaining the arrangement of a printhead (head unit) applicable to the first embodiment. The printhead is divided into a head block 130 and the memory block 131. In this example, the head block is integrated into the chip of one semiconductor base by a semiconductor film formation step or the like. Part or all of the memory block may be integrated into the same semiconductor base as that of the head block 130 to constitute a head base. When the memory capacity of the memory block 131 is large, the memory block 131 may be mounted separately from the head block 130. The head block 130 incorporates the printing element unit 134, the head driving control unit 132, and a head detection unit 133.

As will be described later with reference to FIG. 8, the printing element unit 134 has a plurality of printing elements 1 which are in one-to-one correspondence with circuit elements (to be described later with reference to FIG. 9) in the head driving control unit 132. As will be described later with reference to FIG. 9, the head detection unit 133 incorporates a printhead temperature sensor 12 and a resistance element 11 for correcting and monitoring proper application energy to the printhead. When control is completed, the head detection unit 133 may include a control circuit which controls these units. For an arrangement capable of outputting logic, the head detection unit 133 may comprise an arrangement 10 having an analog/digital conversion function of converting an analog output value from the temperature sensor 12 into a digital signal.

In the memory block 131, reference numeral 23 denotes a printhead memory block which holds feature data for each type of printhead in correspondence with an individual address. The contents of the memory block 23 are manufacturing variation information on the printing element in the printing element unit 134 or the temperature sensor in the head detection unit 133, manufacturing time information containing a printhead manufacturing date, printhead structure information, and a printhead printing dot count value (rewritable). Reference numeral 24 denotes a memory block for ink. For an ink-jet printhead having a separation ink tank, the memory block 24 may be arranged in the separation ink tank. The memory block 24 stores ink type information, manufacturing time information, and use status information.

Figure 8:
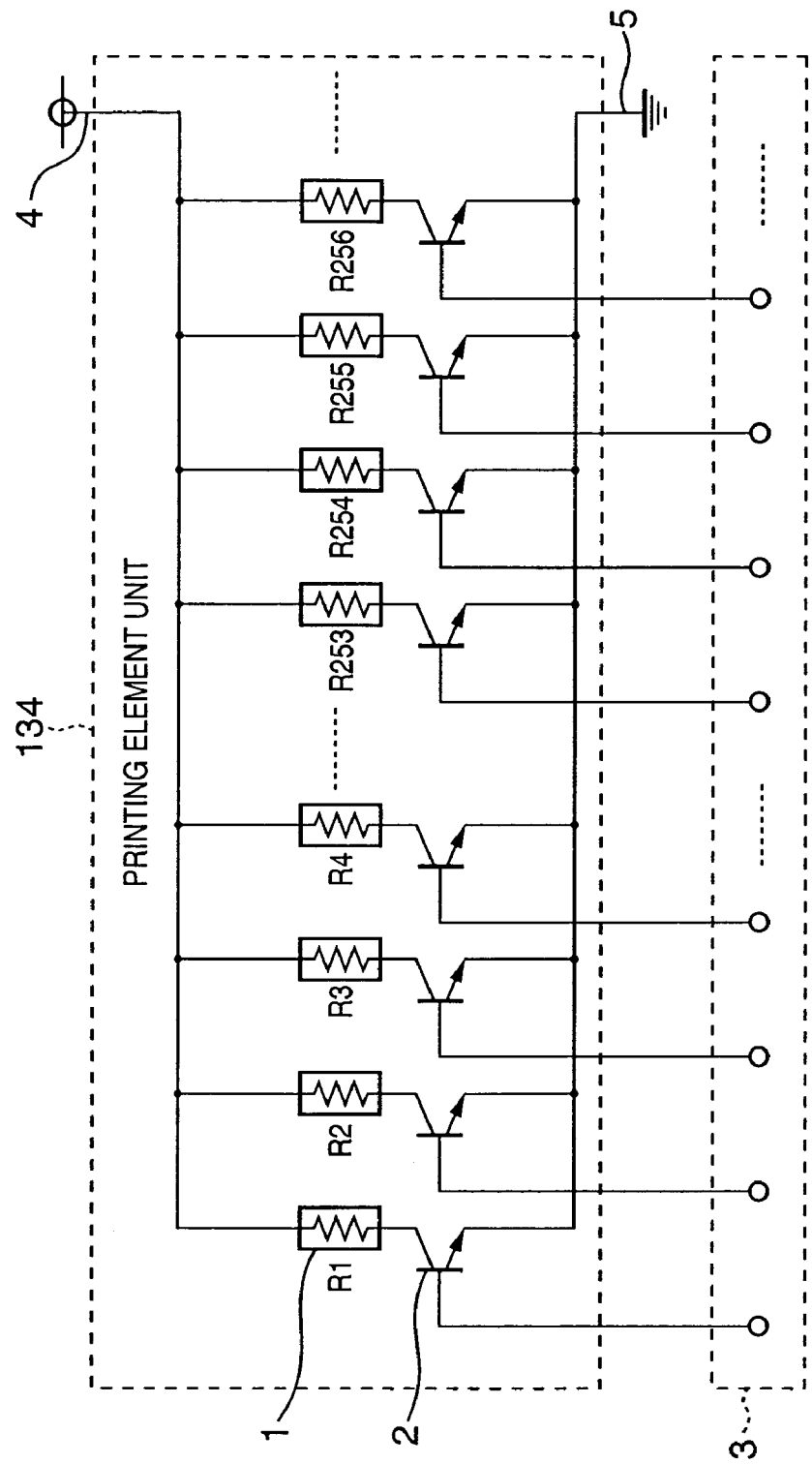
FIG. 8 is a circuit diagram showing a concrete example of a circuit arrangement in which printing elements for performing printing by using heat are driven in time division for each block.
Figure 9:
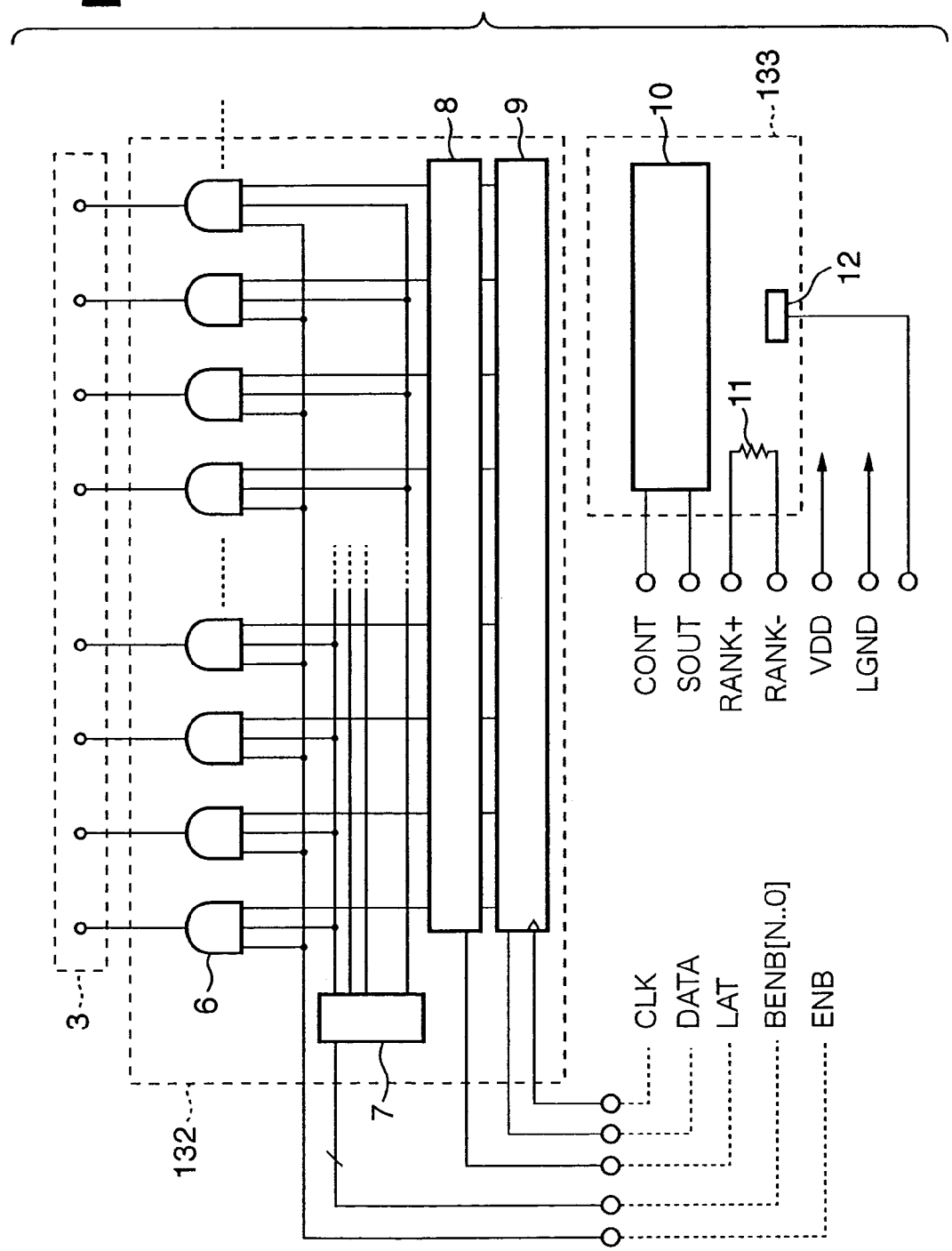
FIG. 9 is a circuit diagram showing a concrete example of another circuit arrangement in which printing elements for performing printing by using heat are driven in time division for each block.
Figure 10:
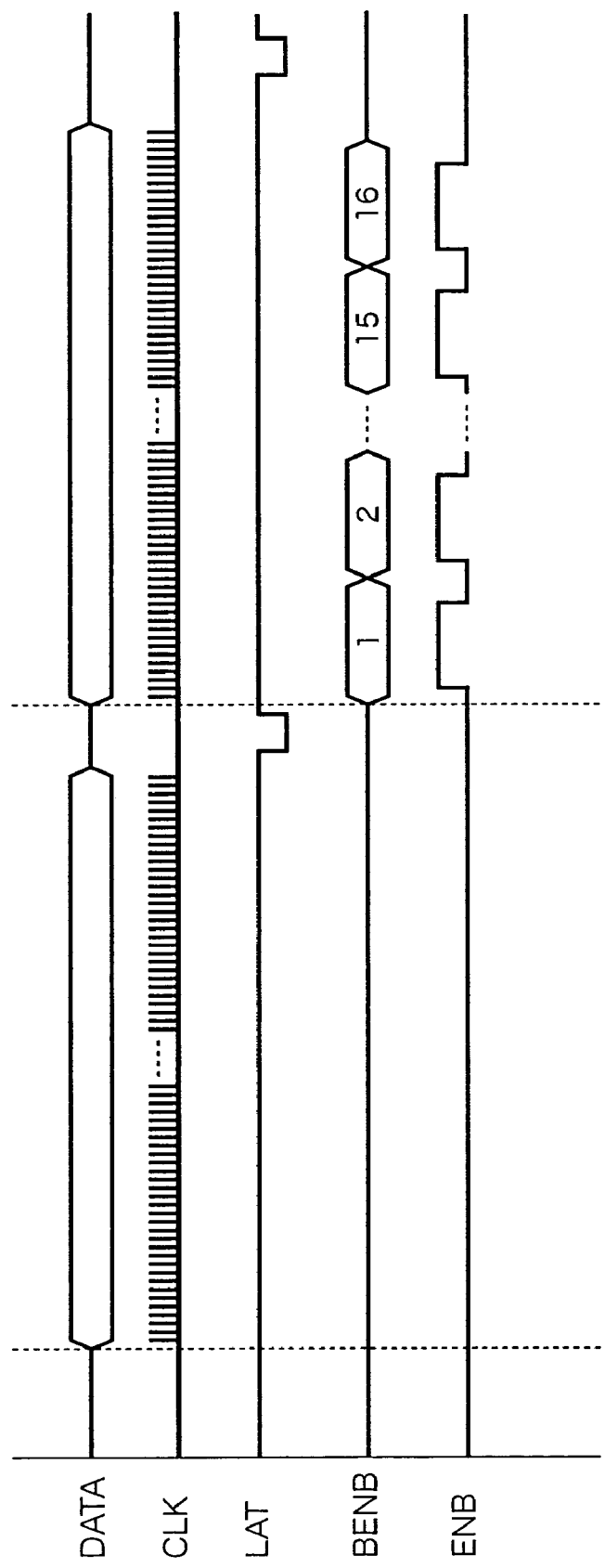
FIG. 10 is a timing chart showing a signal input to the circuit shown in FIG. 9.

FIGS. 8 and 9 are circuit diagrams showing a concrete example of circuit arrangements in which printing elements for performing printing by using heat are driven in time division for each block. FIG. 10 is a timing chart showing a signal input to the circuit shown in FIG. 9.

In FIG. 8, reference numeral 1 denotes an electrothermal transducer such as a heater arranged as a printing element; 2, a driving element such as a transistor or FET which controls the ON state of the electrothermal transducer; 3, an electrical node between the driving element and the head driving control unit (circuit); 4, a power supply line; and 5, a ground line. In the control unit of FIG. 9, reference numeral 6 denotes an AND circuit which outputs a control signal to be supplied to the driving element 2; 7, a decoder; 8, a latch; and 9, a shift register. Reference symbol CLK denotes a clock signal; DATA, an image data signal; LAT, a latch pulse; BENB, a block selection signal; and ENB, a driving pulse signal.

When the printhead is an ink-jet printhead which discharges ink, an ink channel and an orifice for discharging ink are arranged in correspondence with the printing element.

When the image data signal DATA is input, image data are sequentially transferred to the shift register 9 in response to the image data transfer clock CLK, and aligned in the latch 8 in correspondence with respective printing elements. As shown in FIG. 10, the block selection signals BENB are sequentially activated within the cycle of the latch pulse signal LAT, and as a result, time division driving can be achieved. If the block selection signals BENB are distributed and connected to printing elements, distributed driving is executed.

In a printing apparatus having various printing modes, the pattern of the block selection signals BENB input to the decoder 7 in the cycle of the latch pulse signal LAT may not be kept constant but may be changed depending on the printing mode. In this case, printing elements can be driven with various patterns by a combination with other control signals.

As the above-described circuit arrangement, many circuit arrangements have been proposed in accordance with the printing element driving method. In order to minimize the circuit arrangement, the circuit may be comprised of a latch circuit, and shift registers which can sequentially drive blocks obtained by grouping printing elements into several blocks. For a long printhead in which image data is transferred in advance and the divisional driving order can be arbitrarily set in the next cycle, the circuit may preferably comprise a latch circuit, and shift registers corresponding to printing elements. The divisional control circuit 7 is a circuit such as a decoder or shift register.

[Second Embodiment]

Figure 11:
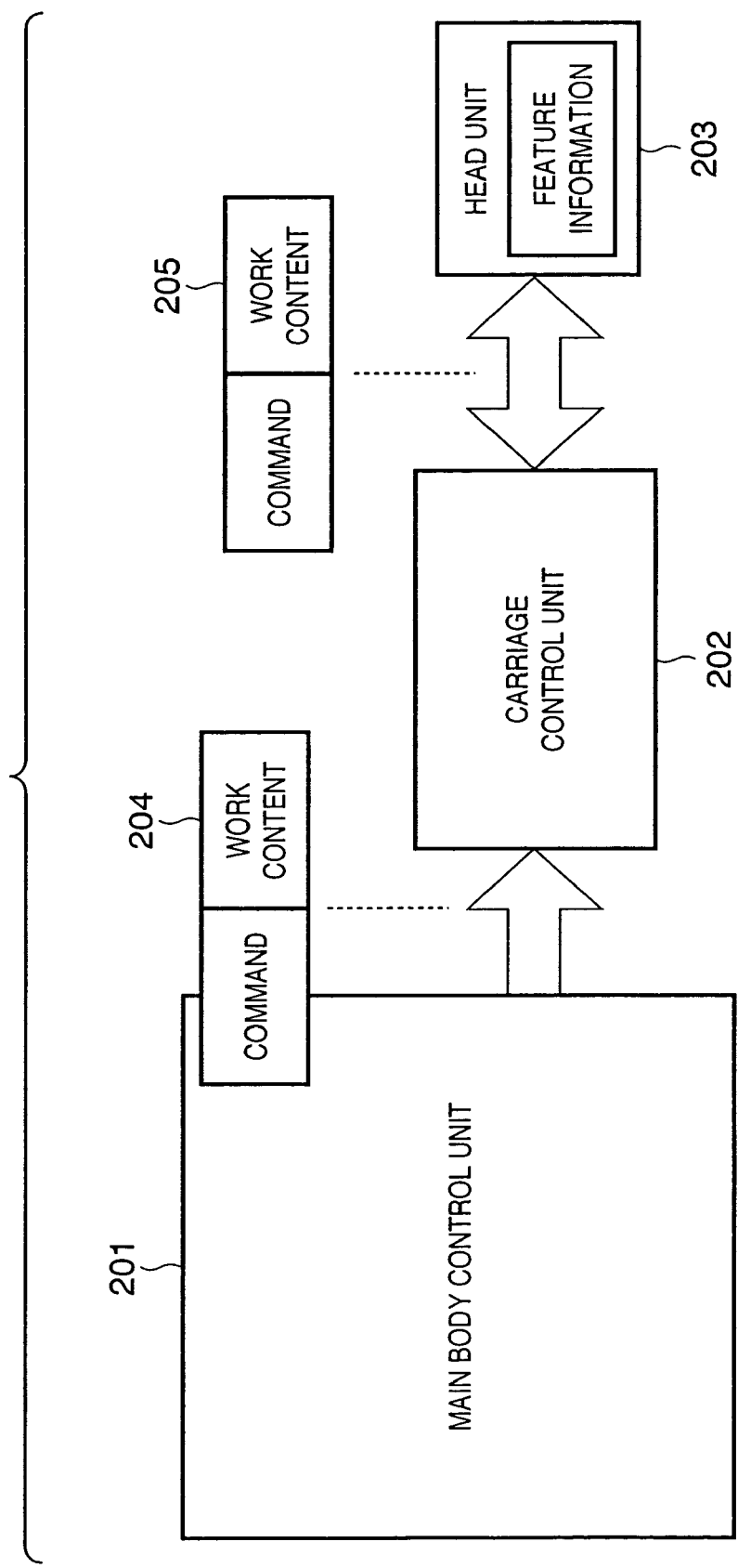
FIG. 11 is a block diagram showing a basic arrangement for acquiring feature information stored in the memory of a printhead according to the second embodiment.

FIG. 11 is a block diagram showing the basic arrangement of a printing apparatus according to the second embodiment.

In the first embodiment (FIG. 3), the main body control unit 101 generates the read instruction command 111 and control instruction command 113 in accordance with the command line. In the second embodiment, a carriage control unit 202 generates a command line. That is, a command (sequence command) 204 transferred from a main body control unit 201 is minimum. The carriage control unit 202 generates a command line on the basis of the command, and transfers a detailed command 205 to the printhead. A head unit 203 of the printhead according to the second embodiment comprises a command control unit" which reads out various pieces of feature information from a memory in accordance with the detailed command 205, and drives and controls the printing element unit.

The printhead is mounted on a carriage HC and electrically connected to it. Electrical connection can adopt various methods such as a contact pad having a gold-plated terminal. The carriage control unit 202 generates a command line in accordance with the command 204 sent from the main body control unit 201, and selectively transfers a control command 205 to the printhead.

Figure 12:
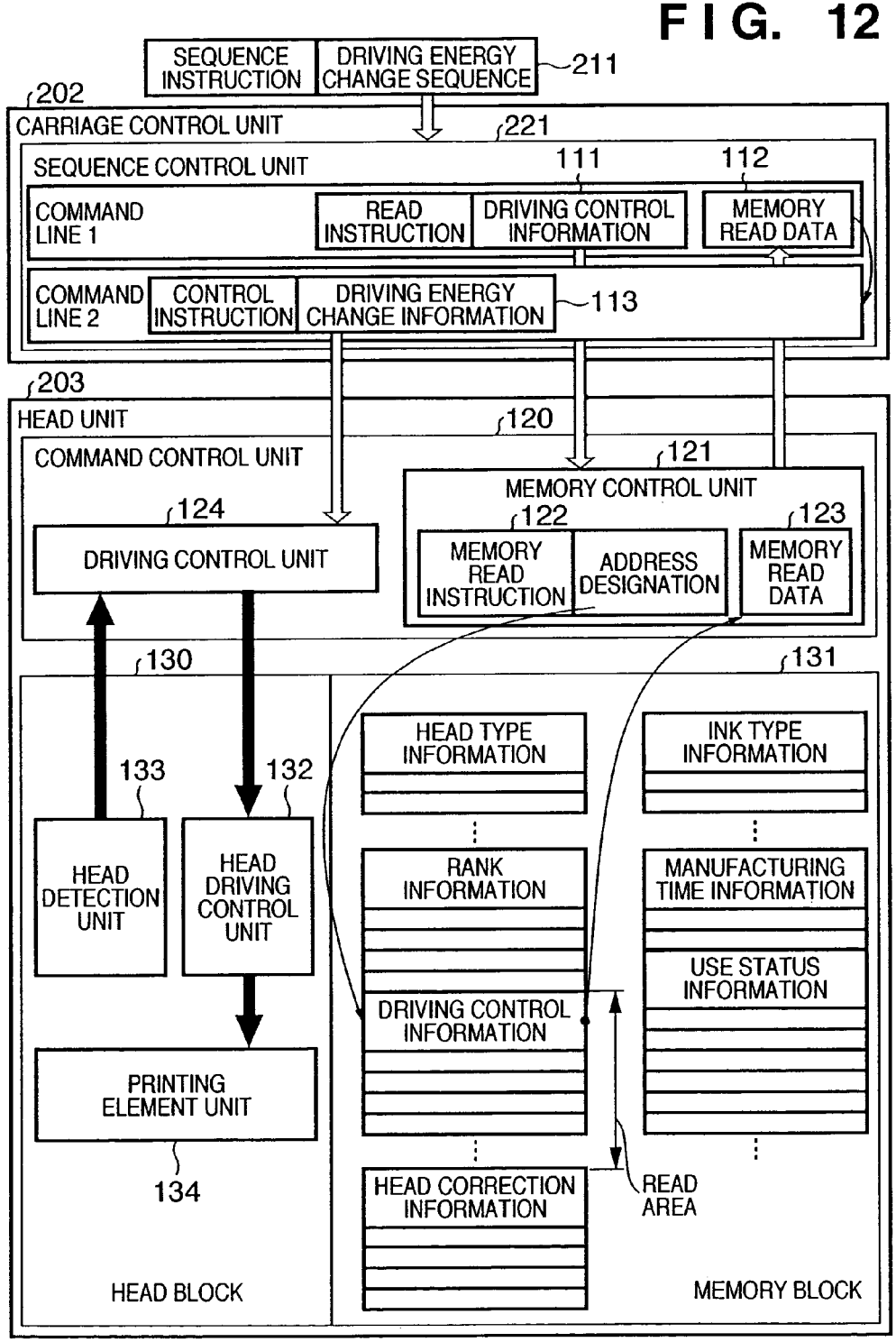
FIG. 12 is a schematic block diagram showing a command communication system according to the second embodiment.

FIG. 12 is a schematic block diagram showing a command communication system according to the second embodiment. The same reference numerals as those in the arrangement described in the first embodiment (FIG. 4) denote parts having the same functions. In the arrangement of FIG. 12, a command control unit 120 which is arranged in the carriage control unit in the first embodiment is arranged in the head unit. The carriage control unit 202 has a sequence control unit 221.

A command 211 from the main body control unit 201 is a minimum command (corresponding to the command 204 in FIG. 11). The minimum command 211 is a sequence command representing the sequence of a plurality of commands. When the command 211 is transferred to the carriage control unit 202, the sequence control unit 221 executes a command line in accordance with the command. For example, the sequence control unit 221 executes, e.g., command lines 1 and 2 (FIG. 4) described in the first embodiment. Since the format of the sequence command is defined by the same format as that of a general command line, the sequence command can be added in accordance with the function. This is an effective function when processing must be completed by only the carriage control unit.

Figure 13:
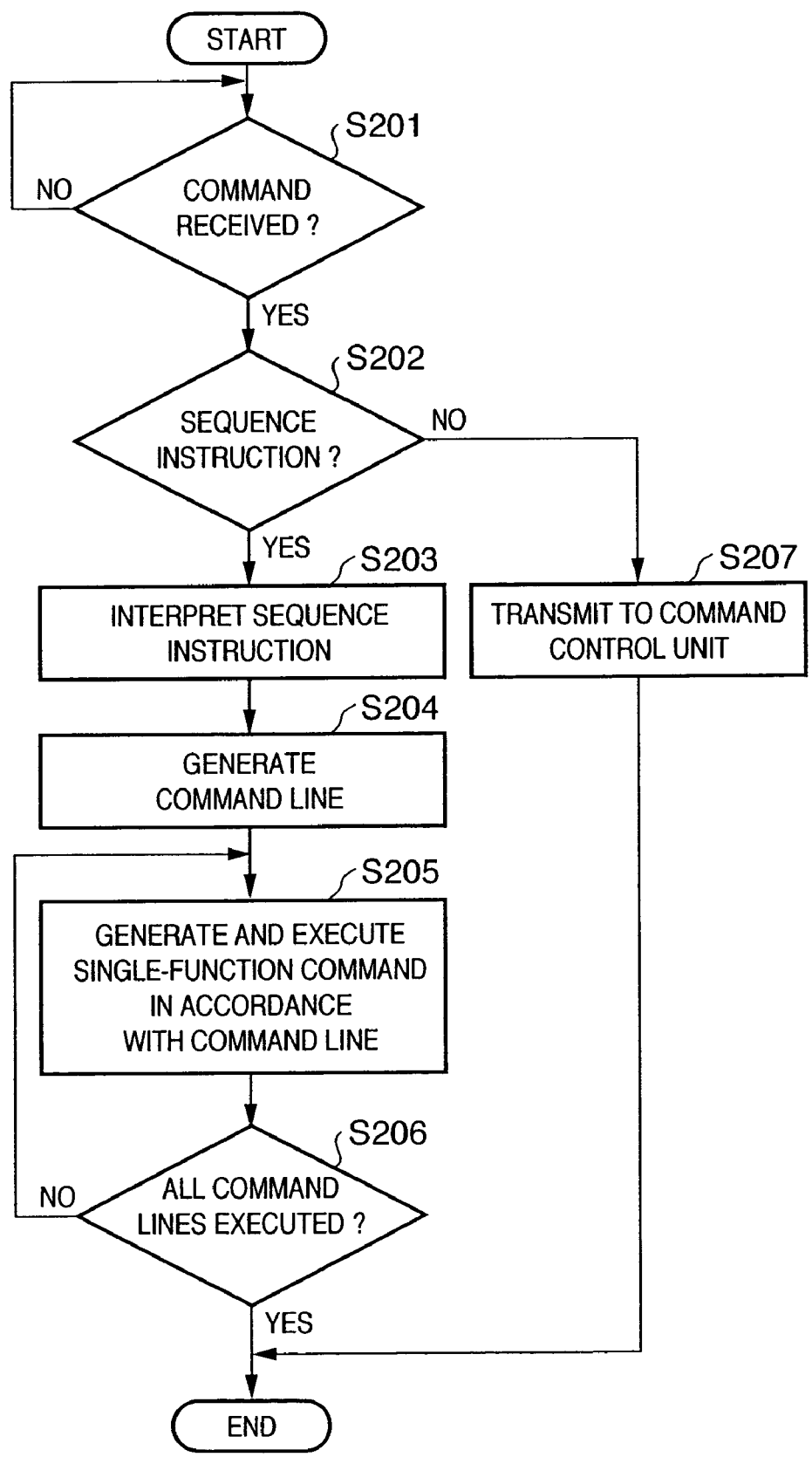
FIG. 13 is a flow chart for explaining the operation of a sequence control unit 221.

FIG. 13 is a flow chart for explaining the operation of the sequence control unit 221. The sequence control unit 221 waits for reception of a command, and if receives a command, determines whether the command is a sequence command (steps S201 and S202). If NO in step S202, the sequence control unit 221 directly transmits the command to the command control unit 120.

If YES in step S202, the sequence control unit 221 interprets the sequence command and generates command lines (steps S203 and S204). The sequence control unit 221 sequentially executes the command lines (steps S205 and S206).

In the example shown in FIG. 12, command line 1 (acquisition of driving control information) and command line 2 (designation of changing driving energy) are generated and executed in accordance with the driving energy change sequence command 211.

If the sequence control unit 221 of the carriage control unit 202 executes command line 1, the sequence control unit 221 sends, e.g., a command 111 for "reading out" "driving control information" of the head. As described in the first embodiment, upon reception of the command 111, a memory control unit 121 of the command control unit 120 of the head unit 203 generates a memory access signal 122 so as to read driving control information stored in a memory block 131 of the head unit 203. The memory control unit 121 stores a table as shown in FIG. 6 that corresponds to the memory block 131 in the head unit 203. The memory control unit 121 is arranged in the printhead, and suffices to have a table corresponding to its memory block. Unlike the first embodiment, the table need not be updated in, e.g., exchanging the printhead, or a plurality of types of tables need not be held.

The memory control unit 121 accesses the memory block 131 in accordance with the access signal 122. The memory block 131 in the head unit 203 is accessed and outputs driving control information to the memory control unit 121. The memory control unit 121 reads out the information (driving control information) designated by the command 111 from the memory block 131, and acquires the information as memory read data 123. The acquired memory read data 123 is sent as the execution result (memory read data 112) of command line 1 to the carriage control unit 202.

At the end of command line 1 by the carriage control unit 202, command line 2 is executed in accordance with the sequence instruction. In command line 2, "driving energy change information" is transferred as a "control command" to the head unit. More specifically, driving energy change information is generated on the basis of the memory read data 123 (driving control information) acquired by command line 1. A command 113 of changing driving control of the printing element, such as the pulse width or pulse voltage of a driving signal for driving the printing element, is generated in accordance with the driving energy change information.

Similar to the first embodiment, if the command control unit 120 of the head unit 203 receives a command 113, a driving control unit 124 changes printing energy of each printing element, and transmits the instruction to a head driving control unit 132. As a result, optimal driving of each printing element in a printing element unit 134 is achieved.

In the second embodiment, the command control unit 120 is arranged in the head unit. The command control unit may be integrated into a head base on which printing elements are formed.

In the second embodiment, the sequence control unit 221 is arranged in the carriage, and the command control unit 120 is arranged in the printhead. The sequence control unit 221 and command control unit 120 may be further arranged in the printhead, and this arrangement will be explained in the third embodiment.

[Third Embodiment]

Figure 14:
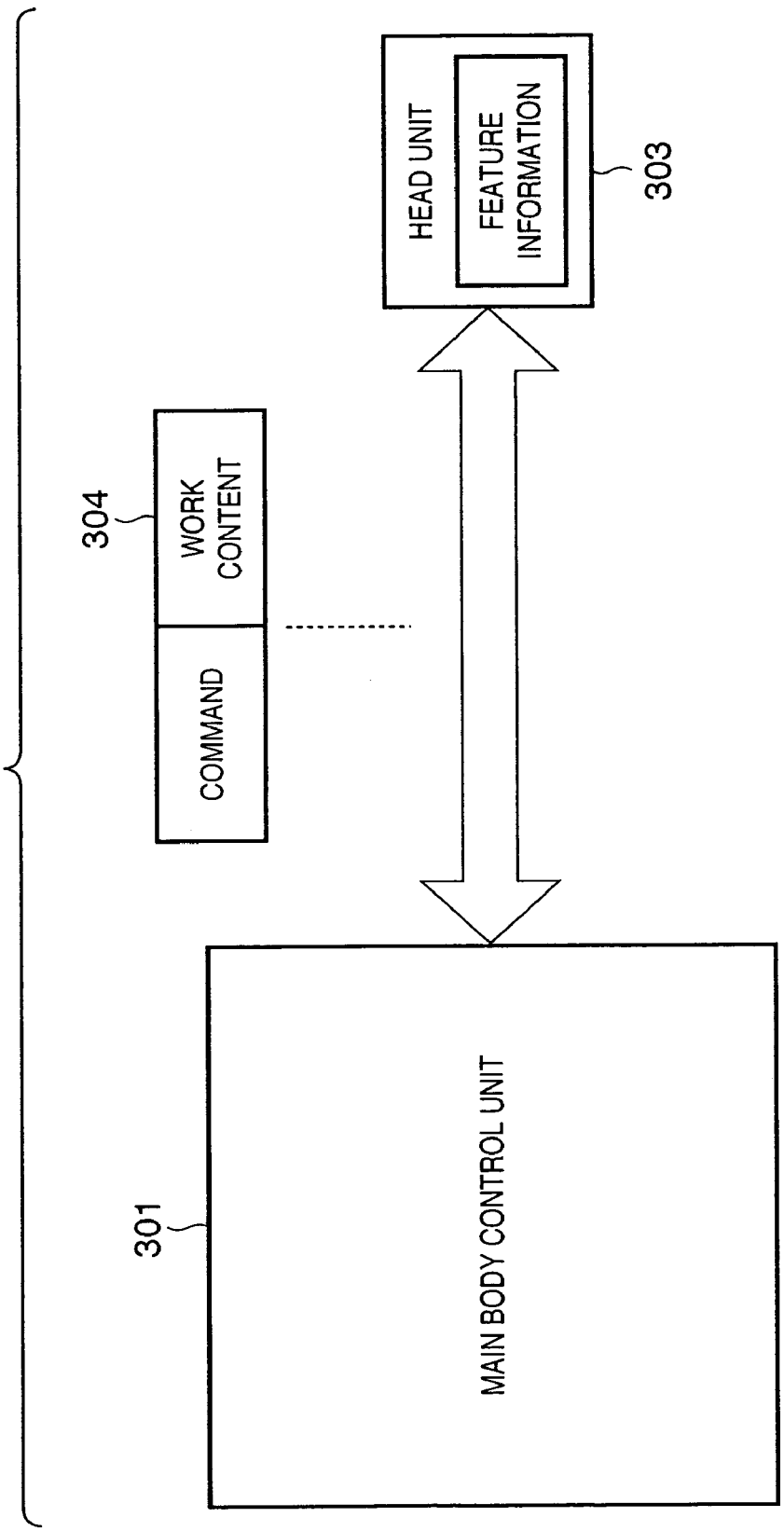
FIG. 14 is a block diagram showing a basic arrangement for acquiring feature information stored in the memory of a printhead according to the third embodiment.

FIG. 14 is a block diagram showing a basic arrangement according to the third embodiment. The arrangement according to the third embodiment is a printing apparatus arrangement using an advanced printhead which can process various sequence instructions within the head.

In the third embodiment, data sent from a main body control unit 301 to a printhead (head unit 303) are only image data (not shown) and a minimum command 304. The head unit 303 comprises a command control unit 120, and a sequence control unit 221 which can expand a sequence command. This form can be applied to a serial head which is mounted on a carriage and scanned, and a long head used in a page printer or the like. The main body control unit 301 and head unit 303 (printhead) are desirably electrically connected by a general connector or card edge type connector. In the arrangement according to the third embodiment, the sequence control unit 221 and command control unit 120 are arranged in the printhead. Arbitrary control can be completely achieved within the printhead in correspondence with a sequence command sent from the main body control unit 301.

Figure 15:
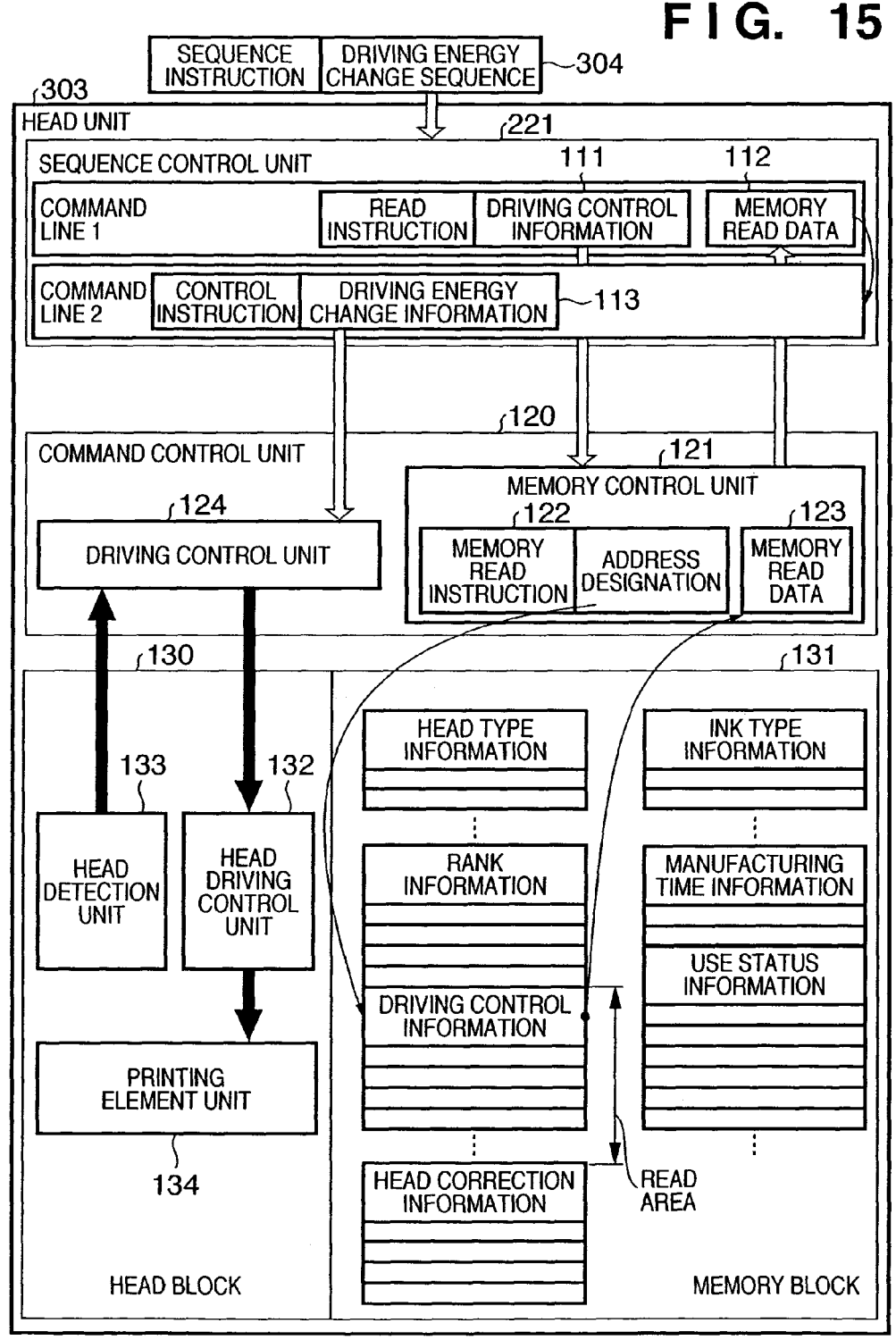
FIG. 15 is a schematic block diagram showing a command communication system according to the third embodiment.

FIG. 15 is a schematic block diagram showing a command communication system according to the third embodiment. The minimum command 304 is a sequence command obtained by sequencing a plurality of commands, and is directly transferred to the head unit 303 of the printhead. For example, command lines 1 and 2 described above are executed within the printhead in accordance with the sequence command 304.

In FIG. 15, the sequence control unit 221 and command control unit 120 have the same functions as those described in the second or first embodiment, their operations are the same as those in the second embodiment, and a detailed description thereof will be omitted.

This sequence can be parallel-processed in accordance with the printhead function. For example, self-completion processing of monitoring a temperature change during driving of the printing element, when the temperature reaches a specific value, changing the printing energy data register, and driving and controlling the printing element can also be achieved. The main body apparatus suffices to send an arbitrary sequence command before transferring image data, and advanced control can be achieved by only a simple control command system.

As described above, the first to third embodiments attain the following effects.

(1) When the head is caused to perform predetermined processing, the control unit of the apparatus main body only outputs a command. The command control unit in the carriage or the command control unit in the head interprets the command, outputs a control signal based on the command, and causes the head to perform processing. This can reduce the processing load in the apparatus main body.

(2) Only necessary feature information can be extracted by the apparatus from pieces of feature information held by the printhead. That is, only necessary information can be extracted from pieces of feature information stored in the head, and the time taken to extract information can be shortened, compared to the prior art in which all pieces of information are extracted from the printhead.

(3) An arrangement in which the contents of a command from the main body control unit are interpreted and the memory of each head is accessed to acquire necessary information is adopted separately from the main body control unit. When the apparatus is to extract information from the printhead, a command is transmitted to the arrangement to acquire necessary information from the printhead. This arrangement makes it possible to reliably acquire only information necessary for the apparatus main body even from a head having a different memory specification or different feature information storage address. The degree of freedom of the printhead memory design also increases. The arrangement (command control unit) in which a command from the apparatus is interpreted and necessary data is acquired can be arranged in the carriage of the apparatus, the printhead, or the element base which constitutes the printhead (base (including the board) having a heating element).

[Fourth Embodiment]

The fourth embodiment will describe a command structure used in the above-described sequence control unit 221 and command control unit 120.

Figure 16:
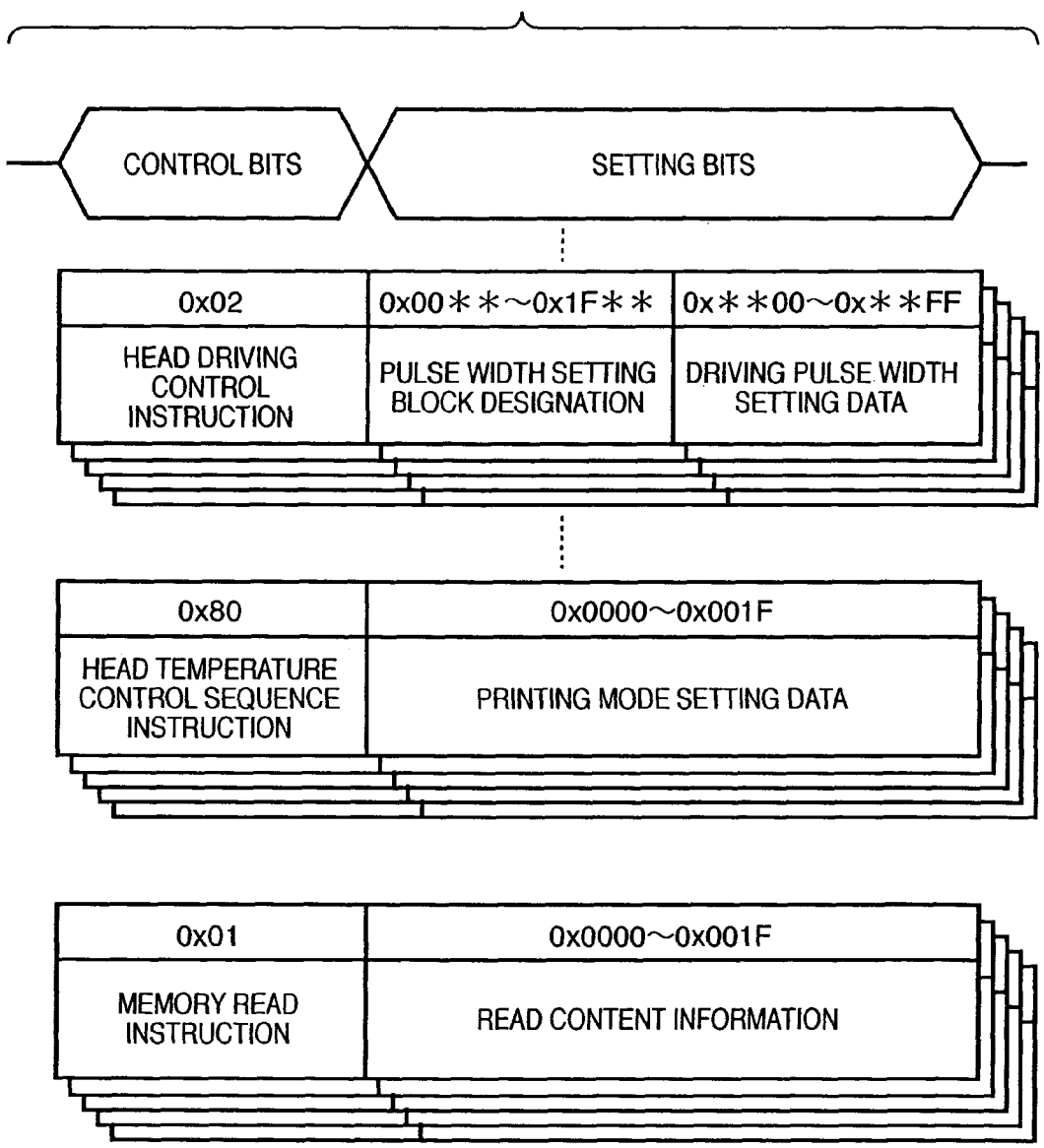
FIG. 16 is a data image view showing a command structure in a printing apparatus according to the fourth embodiment.

FIG. 16 is a data image view showing a command structure in a printing apparatus according to the fourth embodiment. A command which functions in the printing apparatus of the fourth embodiment includes a "single-function command" and "sequence command", and is an "instruction which so acts as to output specific information". The command format can be created by, e.g., serial data as shown in FIG. 16. The number of command data bits is, e.g., a total of 24 bits, 8 bits transferred first are categorized into "control bits" for designating control of the printing apparatus, and subsequent 16 bits are categorized into "setting bits" for setting data necessary for printing control. In this case, "setting bits" may be further categorized in accordance with a control function categorized by "control bits". An instruction of a total of 2 bytes, i.e., a 1-byte instruction of "control bits" and a derivative 1-byte instruction may be set.

In the case of FIG. 16, a command having "control bits" 0x02 is defined as a single-function command which sets a driving pulse width for selectively supplying a printing current to the printhead. When the main body control unit of the printing apparatus or the carriage control unit sends the single-function command, the printhead, the carriage control unit, or a command control unit 120 of the printhead so functions as to set a driving pulse width for each block in which printing elements in the printhead are divisionally driven. At this time, each block is designated by an instruction of the second byte, and an area from 0x00 to 0x1F is applied. Driving pulse width data to be set is described at the third byte.

The "setting bit" is used as preset data to, e.g., a counter circuit for setting a pulse width. An arbitrary pulse width can be set to apply optimal printing energy to the printing element block of the printhead. Various arrangements can be preset by a setting combination of the second and third bytes in accordance with the printhead feature such that the driving pulse width is set to double pulses.

This setting area is merely an example, and the area can be arbitrarily ensured in accordance with the printhead form. In the fourth embodiment, the command is a single-function command for the most significant bit=0 and a sequence command for the most significant bit=1, which will be described later. The format of FIG. 16 can set 128 types of commands such as a single-function command (in FIG. 16, a command of control bits 0x01) for reading out arbitrary information from the memory block in the printhead, and a single-function command regarding printhead function control.

The area of the single-function command can also be arbitrarily ensured. It is also possible to define a sequence command prepared by selecting a plurality of single-function commands and combining them into a sequence. The area for sequence command and the area for command designation share the "control bits" area. A command can be added along with the improvement of the sequence command function by giving a small margin to the sequence command area and command designation area. A case in which the printhead temperature is monitored to select printing energy control will be exemplified as a sequence command transferred from the main body control unit for "control bits".

Sequence control is executed by interposing processing (2) between single-function commands (1) and (3):

(1) The temperature is acquired from the printhead temperature detection unit (position number) (in an arbitrary acquisition timing mode).

(2) The driving pulse width is determined on the basis of the acquired temperature information by using a table which makes, e.g., the head temperature and the pulse width of a driving signal correspond to each other.

(3) The driving pulse width (pulse width data) is set for each block (block number) in which printing elements in the printhead are divisionally driven. Processing (2) may be done by the main body control unit of the printing apparatus or the carriage control unit. The sequence command uses the same command format, and command management can be commonly expanded to an advanced function.

Single-function commands are registered as submodules by function, and commands can be widely used. Instead of merely adding commands, functional single-function commands are prepared as a standard and utilized as a sequence command. The margin of the command area can be ensured, and structuring programming between control units can be achieved. This is effective in future control of the printing apparatus. The command format can be sent as parallel data in addition to the above-mentioned serial data. Transfer of parallel data shortens the transfer time, and is effective for increasing the transfer speed when the data bus has a margin.

By using a common command format, a command from a unit other than the main body control unit of the printing apparatus can be received. By standardizing the command format including a function other than the head of the printing apparatus, a command from an external image processing device (digital camera, digital video, scanner, or the like) can be received and printed.

Figure 17:
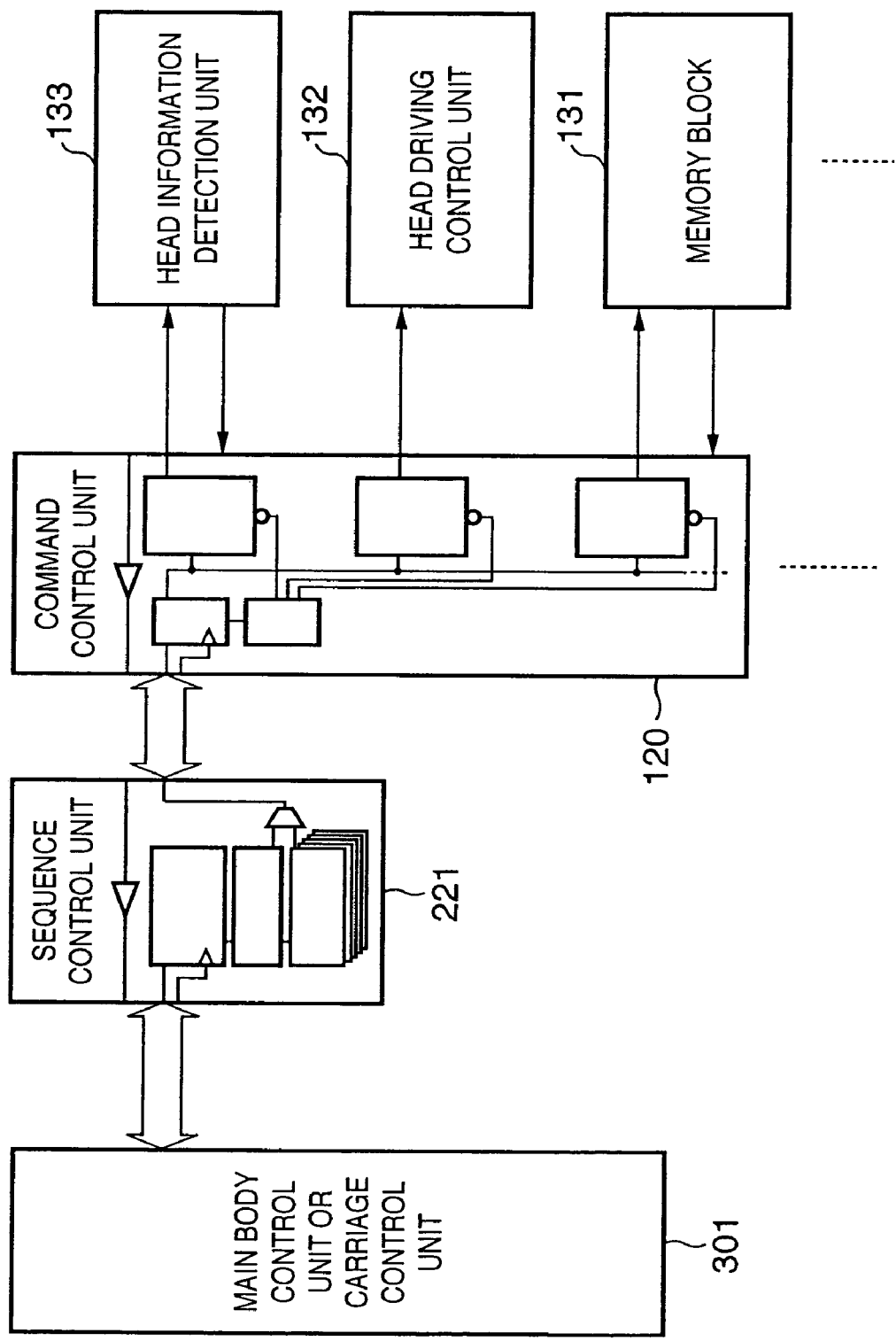
FIG. 17 is a circuit block diagram for explaining a command processing function according to the fourth embodiment.

FIG. 17 is a circuit block diagram for explaining a command processing function according to the fourth embodiment. A method of receiving a command transferred from the main body control unit or carriage control unit and achieving a function by each control unit of the printhead will be sequentially explained. In FIG. 17, an arrangement in which a sequence control unit 221 and the command control unit 120 are arranged in the printhead corresponds to the third embodiment, and an arrangement in which the sequence control unit 221 is arranged in the carriage control unit and the command control unit 120 is arranged in the printhead corresponds to the second embodiment. An arrangement in which the sequence control unit 221 is arranged in the main body apparatus and the command control unit 120 is arranged in the carriage control unit corresponds to the first embodiment.

A case in which the main body control unit or carriage control unit sends a single-function command to the carriage control unit or printhead will be explained. A command first passes through the sequence control unit 221 which has a function of determining whether the received command is a single-function command or sequence command (step S202 in FIG. 13). For the command system as shown in FIG. 16, whether the command is a sequence command or single-function command can be determined by determining whether the most significant bit of "control bits" is "1".

If the most significant bit of "control bits" is "0", the command is a single-function command, and the sequence control unit 221 shifts the single-function command to the command control unit 120 (step S207). The command control unit 120 stores the "control bits" of the single-function command in the internal register, and determines by the function of the single-function command which control block is to be freed, i.e., which register is to be selected. The command control unit 120 sends "setting bits" as data to the feedback control block. As a result, each control unit of the printhead achieves processing corresponding to the single-function command, and functions individually.

For example, when a head driving control instruction 0x02 is set in the "control bits", the most significant bit is "0", and the command passes through the sequence control unit 221, and the command control unit 120 (driving control unit 124) sets "setting bit" data to a head driving control unit 132. The head driving control unit 132 is a circuit which controls printhead driving energy. For example, for the single-function command, the printing current supply time (pulse width) is individually set for each block in which printing elements are simultaneously driven. A means for setting a pulse width is generally processed as multiple setting data having a specific resolving power cycle using a counter or the like. "Setting bit" data supplied to the circuit is divided into upper 8 bits and lower 8 bits, which serve as block number designation data for simultaneously driving printing elements and pulse width setting data. For example, for the number of blocks=8, the single-function command is transferred eight times, completing data presetting in the pulse width setting circuit of the head driving control unit 132. After that, an individual pulse width setting circuit energizes a printing element with a set pulse width in synchronism with the driving timing.

A case in which the main body control unit or carriage control unit sends a sequence command to the carriage control unit or printhead will be explained. In the sequence command, the most significant bit of "control bits" is "1". If the most significant bit of "control bits" of an input command is determined to be "1", the sequence control unit 221 interprets the sequence command line and generates a necessary single-function command line (generates a single-function command line on the basis of the contents of the setting bits) (steps S203 and S204 in FIG. 13). The sequence control unit 221 has a pointer function of designating a single-function command, and if it determines a sequence command, sequentially generates an address pointer.

For example, for a sequence command for monitoring the printhead temperature and selecting printing energy control, (1) The command control unit generates a single-function command for acquiring a temperature from the printhead temperature detection unit (position number) (in an arbitrary acquisition timing mode) (position number and mode are preset in accordance with the type of sequence command).

(2) Temperature acquisition data is acquired from the printhead, a rise from the initial temperature is compared, and data to be preset in the command is generated.

(3) The command control unit 120 executes a single-function command for setting a driving pulse width (pulse width data) for each block (block number) in which printing elements in the printhead are divisionally driven.

In this manner, the command generator is instructed to generate single-function commands (1) and (3) via processing (2). In processing (2), a return value (temperature data) sent back from the printhead upon transfer of a single-function command is processed. The return value data also passes through the same data line. The main body control unit of the printing apparatus or the carriage control unit shifts to the control routine on the basis of the data in synchronism with a sequence command.

In single-function command (1), an output from the printhead temperature sensor in the head information detection unit is A/D-converted and fed back as a return value. Based on the data, the head driving control unit controls printhead driving energy by single-function command (3). Such complicated control can be instantaneously completed using a sequence command.

If the sequence command can be executed by only the carriage control unit or printhead without the mediacy of the main body control unit, the main body control unit only transfers image data as printhead operation in addition to command transfer. It is also possible to employ an image data transfer start command and use subsequently transferred data as image data. That is, the command transfer line and image data transfer line can be implemented by a single line. This means that the main body apparatus is almost released from printhead control feedback processing by preparing only a minimum command transfer line. As a result, the main body apparatus can concentrate on motor control for carriage movement and main scanning/subscanning of paper feed, medium detection, and the like. The design/development cost of a new main body gate array complying with the printhead can be greatly reduced. Printheads of the same type can use a common main body gate array. The service load in the market can also be reduced, providing a synergistic effect.

As described in detail above, the printing apparatus according to each embodiment can simplify printhead control by the main body apparatus into command communication even for complicated driving control accompanying the improvement of the printhead function. Processing can be completed within a short time because, for example, even access to the printhead memory which holds pieces of information can be controlled by referring to only arbitrary information. These control operations can be parallel-processed, greatly shortening the conventional control time of the printhead by the main body apparatus.

The arrangement according to each embodiment is achieved by setting a command format corresponding to the printhead. The command format functions as a control line which links the printhead and main body apparatus. In a conventional printhead, the carriage control unit controls a command from the main body control unit in accordance with the purpose, which provides a command format system.

Even a more advanced printhead can be coped with by adding the type of command format, and the command can be kept utilized. More advanced control can also be realized by a sequence command which is a combination of commands. The present invention can be applied regardless of the electrical/mechanical arrangement, software sequence, and the like as long as the main body apparatus, carriage control unit, and printhead are linked by command communication.

In the above embodiments, the ink-jet printing apparatus is a bubble-jet printing apparatus which discharges ink by using heat energy. However, the printing apparatus is not limited to this, and may be an ink-jet printing apparatus using a piezoelectric element as a printing element. The present invention can also be applied to another printing apparatus such as a thermal printing apparatus.

The liquid to be discharged is ink in the above embodiments, but is not limited to ink, and may be, e.g., a processing solution for solidifying ink.

The liquid is not limited to a printing liquid, and can be a chemical, perfume, or liquid containing a material substance for forming wiring, various functional elements, or the like, as long as the liquid is discharged and used.

As has been described above, according to the present invention, the head can be caused to execute predetermined processing by only outputting a command serving as a processing instruction from the control unit of the apparatus main body. The control load on the apparatus main body can be reduced.

When a printhead information acquisition command is employed as a command, information held by the printhead can be efficiently extracted.

According to the present invention, necessary information can be acquired from the printhead at a high speed.

According to the present invention, the degree of freedom of using a memory mounted in the printhead can be increased.

As many apparently widely different embodiments of the present invention can be made without departing from the spirit and scope thereof, it is to be understood that the invention is not limited to the specific embodiments thereof except as defined in the claims.

What is claimed is:

1. A printing apparatus which performs printing by using a printhead having a printing element for performing printing on a target printing medium, comprising:
    command generation means for outputting a command for setting data for causing the printhead to perform predetermined processing;
    storage means, arranged on the printhead, for storing information;
    a carriage which supports the printhead and scans the printhead on the target printing medium; and
    control means, arranged on said carriage, for controlling the printhead based on the command, said control means including:
    receiving means for receiving the command generated by said command generation means,
    conversion means for obtaining an address of said storage means based on the command received by said receiving means, and outputting an access signal based on the address, and
    acquisition means for acquiring, from said storage means, information corresponding to the access signal,
    wherein said conversion means has, in correspondence with each of a plurality of types of printheads, a table which makes the information specified by the command and a storage address correspond to each other, and generates the access signal by looking up a table corresponding to a mounted printhead.

2. The apparatus according to claim 1, wherein the command generated by said command generation means includes a command for driving and controlling the printhead.

3. The apparatus according to claim 1, wherein said command generation means is arranged in said carnage, interprets an input sequence instruction, generates a command for causing the printhead to perform predetermined processing, and outputs the command to the printhead.

4. The apparatus according to claim 3, wherein said command generation means generates a second command on the basis of a result acquired from the printhead in accordance with a first command, and outputs the second command to the printhead.

5. The apparatus according to claim 1, wherein the printing element comprises a heating element, and performs printing by discharging ink from an orifice arranged in correspondence with the heating element.

6. An element base for a printhead having a plurality of printing elements for performing printing and a driving control circuit for selectively driving the plurality of printing elements, comprising:
    storage means for storing information;
    reception means for receiving an externally input command; and
    control means for performing control corresponding to the command received by said reception means, said control means including:
    conversion means for obtaining an address of said storage means based on the command received by said reception means, and outputting an access signal based on the address, and
    acquisition means for acquiring, from said storage means, information corresponding to the access signal,
    wherein said conversion means comprises a table which makes information specified by the command and a storage address in said storage means correspond to each other, and converts the command into an address of said storage means by looking up the table.

7. A method of controlling a printing apparatus including a printhead having a printing element for performing printing and storage means for storing information, a first control unit, which controls the printing apparatus, and a second control unit, which is mounted on a carriage for carrying the printhead or arranged in the printhead, and can operate independently of the first control unit, said method comprising:
    a command generation step of causing the first control unit to generate a command for setting data for acquiring specific information from information held by the printhead; and
    a control step of causing the second control unit to receive the command generated in said command generation step, obtain an address of the storage means of the printhead based on the received command, output an access signal based on the address and acquire information corresponding to the access signal from the storage means,
    wherein said control step utilizes, in correspondence with each of a plurality of types of printheads, a table which makes the information specified by the command and a storage address correspond to each other, and generates the access signal by looking up a table corresponding to a mounted printhead.

8. A printhead having a plurality of printing elements for performing printing, comprising:
    storage means for storing information;
    receiving means for receiving an externally input command; and
    control means for controlling the printhead based on the command received by said receiving means, said control means including:
    conversion means for obtaining an address of said storage means based on the command received by said receiving means, and outputting an access signal based on the address, and
    acquisition means for acquiring, from said storage mean, information corresponding to the access signal,
    wherein said conversion means comprises a table which makes information specified by the command and a storage address in said storage means correspond to each other, and converts the command into an address of said storage means by looking up the table.

9. The printhead according to claim 8, further comprising generation means for generating a control signal for driving and controlling the printhead on the basis of the command received by said reception means.

* * * * *